United States Patent
Etzbach et al.

(12) 
(10) Patent No.: US 6,302,924 B1
(45) Date of Patent: *Oct. 16, 2001

(54) DYE MIXTURES CONTAINING THIENYL AND/OR THIAZOLAZO DYES

(75) Inventors: Karl-Heinz Etzbach, Frankenthal; Rüdiger Sens, Mannheim; Claudia Kräh, Mutterstadt; Frank Wüthner, Mannheim, all of (DE)

(73) Assignee: Basf Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,172

(22) PCT Filed: Mar. 10, 1997

(86) PCT No.: PCT/EP97/01201

§ 371 Date: Sep. 22, 1998

§ 102(e) Date: Sep. 22, 1998

(87) PCT Pub. No.: WO97/35926

PCT Pub. Date: Oct. 2, 1997

(30) Foreign Application Priority Data

Mar. 22, 1996 (DE) .............................. 196 11 351

(51) Int. Cl.$^7$ ........................................ D06P 1/04
(52) U.S. Cl. .................... 8/466; 8/467; 8/639; 8/643; 8/691
(58) Field of Search ................ 8/466, 467, 471, 8/571, 575, 639, 643, 920, 568, 691

(56) References Cited

U.S. PATENT DOCUMENTS

| | | | |
|---|---|---|---|
| 4,427,413 | * | 1/1984 | Bauerle ................... 8/471 |
| 4,505,857 | * | 3/1985 | Egli ...................... 534/768 |
| 4,764,178 | | 8/1988 | Gregory et al. ............ 8/471 |
| 4,820,809 | * | 4/1989 | Bergmann et al. ........ 534/765 |
| 5,059,684 | * | 10/1991 | Lamm et al. ............. 534/765 |
| 5,079,365 | * | 1/1992 | Sens et al. ............... 546/119 |
| 5,112,362 | * | 5/1992 | Hahn et al. ............... 8/639 |
| 5,158,928 | * | 10/1992 | Bach et al. ............... 503/227 |
| 5,216,139 | * | 6/1993 | Etzbach et al. ........... 8/536 |
| 5,256,624 | * | 10/1993 | Etzbach et al. ........... 503/227 |
| 5,283,326 | * | 2/1994 | Hansen et al. ............ 534/766 |
| 5,785,719 | * | 7/1998 | Etzbach et al. ............ 8/471 |
| 5,789,560 | * | 8/1998 | Etzbach et al. ........... 534/752 |
| 5,853,432 | * | 12/1998 | Etzbach et al. ............ 8/643 |

FOREIGN PATENT DOCUMENTS

| | | |
|---|---|---|
| A 31 08 077 A1 | 1/1982 | (DE) . |
| 3428458 * | 2/1986 | (DE) . |
| 44 37 166 A | 4/1996 | (DE) . |
| 0 083 553 A1 | 7/1983 | (EP) . |
| 0 201 896 A1 | 12/1986 | (EP) . |
| 269953 * | 6/1988 | (EP) . |
| 0 311 910 A | 4/1989 | (EP) . |
| 0 235 939 A3 | 5/1989 | (EP) . |
| 0 390 027 A1 | 3/1990 | (EP) . |
| 0 392 358 A | 10/1990 | (EP) . |
| 0 392 359 A | 10/1990 | (EP) . |
| 0 416 434 A3 | 8/1991 | (EP) . |
| 0 450 434 A | 10/1991 | (EP) . |
| 0 453 020 A | 10/1991 | (EP) . |
| 0 509 302 A1 | 10/1992 | (EP) . |
| 0 546 403 A1 | 6/1993 | (EP) . |
| 0 579 299 A | 1/1994 | (EP) . |
| WO 9603462A1 | 2/1996 | (WO) . |
| 96/11987 * | 4/1996 | (WO) . |

OTHER PUBLICATIONS

Research Disclosure, NR. 353, Sep. 1, 1993, pp. 615–627, "Dye–Donor Elements And Dye–Receiving Elements For Thermal Transfer".

The Chemistry of Synthetic Dyes, vol. 111, pp. 391–413, 1970, Academic Press, London (no month available).

* cited by examiner

Primary Examiner—John Hardee
(74) Attorney, Agent, or Firm—Oblon, Spivak, McClelland, Maier & Neustadt, P.C.

(57) ABSTRACT

Dye mixtures comprising one or more thienyl- and/or thiazole-azo dyes with a coupling component of the aminothiazole, aniline or tetrahydroquinoline series, one or more dyes of the class of the monoazo or disazo dyes, methine dyes, azamethine dyes, anthraquinone dyes, nitro dyes or quinophthalone dyes which have their respective absorption maximum at a wavelength of from 410 to 520 nm and optionally one or more dyes of the class of the monoazo or disazo dyes, methine dyes, azamethine dyes, anthraquinone dyes, nitro dyes or quinophthalone dyes which have their respective absorption maximum at a wavelength of from 600 to 700 nm, the FWHM value of the absorption maximum being at least 2000 cm$^{-1}$, are useful for thermal transfer and for dyeing or printing synthetic materials.

9 Claims, No Drawings

DYE MIXTURES CONTAINING THIENYL AND/OR THIAZOLAZO DYES

DESCRIPTION

The present invention relates to novel dye mixtures comprising one or more azo dyes (F1) of the formula I

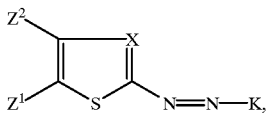

where
K is a radical of the formula

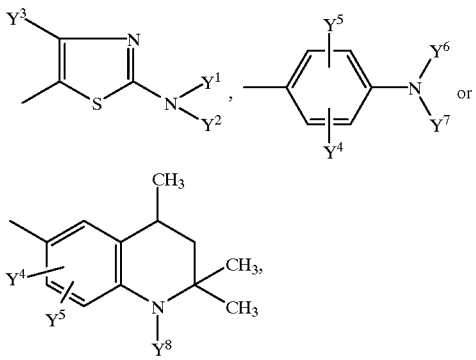

X is nitrogen or $C-Z^3$, $Z^1$ is nitro, cyano, $C_1-C_6$-alkanoyl, benzoyl, $C_1-C_8$-alkoxycarbonyl, $C_1-C_8$-alkylsulfonyl, unsubstituted or $C_1-C_4$-alkyl-, $C_1-C_4$-alkoxy-, halogen- or nitro-substituted phenylsulfonyl or a radical of the formula $-CH=T$, where T is a radical of an acidic-CH compound of the formula $H_2T$, $Z^2$ is hydrogen, $C_1-C_6$-alkyl, unsubstituted or $C_1-C_4$-alkyl-, $C_1-C_4$-alkoxy-, halogen- or nitro-substituted phenyl, cyano, halogen, unsubstituted or phenyl- or $C_1-C_4$-alkoxy-substituted $C_1-C_6$-alkoxy, unsubstituted or phenyl-substituted $C_1-C_8$-alkylthio, unsubstituted or $C_1-C_4$-alkyl-, $C_1-C_4$-alkoxy-, halogen- or nitro- substituted phenylthio, $C_1-C_8$-alkylsulfonyl, unsubstituted or $C_1-C_4$-alkyl-, $C_1-C_4$-alkoxy-, halogen- or nitro-substituted phenylsulfonyl or $C_1-C_8$-alkoxycarbonyl, $Z^3$ is $C_1-C_8$-alkoxycarbonyl, cyano, nitro or hydrogen, $Y^1$ and $Y^2$ are independently of each other $C_1-C_{10}$-alkyl which is unsubstituted or substituted by cyano, hydroxyl, halogen, $C_1-C_4$-alkanoyloxy, $C_1-C_4$-alkoxycarbonyl, $C_1-C_4$-alkoxycarbonyloxy, whose alkyl chains may each be interrupted by 1 oxygen atom in ether function, or phenyl and may be interrupted by from 1 to 4 oxygen atoms in ether function, $C_5-C_7$-cycloalkyl, $C_3-C_4$-alkenyl, unsubstituted or $C_1-C_4$-alkyl-, $C_1-C_4$-alkoxy-, halogen- or nitro-substituted phenyl, or $Y^1$ and $Y^2$ together with the nitrogen atom joining them together are a 5- or 6-membered saturated heterocyclic radical with or without further hetero atoms, or else $Y^1$ is hydrogen, $Y^3$ is $C_1-C_{10}$-alkyl, $C_5-C_7$-cycloalkyl, unsubstituted or $C_1-C_4$-alkyl-, $C_1-C_4$-alkoxy-, halogen- or nitro-substituted phenyl or thienyl, $Y_4$ is hydrogen, $C_1-C_{10}$-alkyl with or without interruption by from 1 to 4 oxygen atoms in ether function, hydroxyl, $C_1-C_6$-alkoxy, in particular methoxy or ethoxy, $C_1-C_4$-alkylsulfonylamino, mono- or di($C_1-C_8$-alkyl)aminosulfonylamino or the radical $-NHCOY^9$ or $-NHCO_2Y^9$, where $Y^9$ is phenyl, benzyl, tolyl or $C_1-C_{10}$-alkyl with or without interruption by from 1 to 4 oxygen atoms in ether function, $Y^5$ is hydrogen, $C_1-C_6$-alkyl or $C_1-C_6$-alkoxy, $Y^6$ and $Y^7$ a) when X is $C-Z^3$, are independently of each other hydrogen, $C_1-C_{10}$-alkyl which is unsubstituted or substituted by cyano, hydroxyl, halogen, $C_1-C_4$-alkanoyloxy, $C_1-C_4$-alkoxycarbonyl, $C_1-C_4$-alkoxycarbonyloxy, whose alkyl chains may each be interrupted by 1 oxygen atom in ether function, or phenyl and may be interrupted by from 1 to 4 oxygen atoms in ether function, $C_5-C_7$-cycloalkyl, $C_3-C_4$-alkenyl, unsubstituted or $C_1-C_4$-alkyl-, $C_1-C_4$-alkoxy-, halogen- or nitro-substituted phenyl, or $Y^6$ and $Y^7$ together with the nitrogen atom joining them together are a 5- or 6-membered saturated heterocyclic radical with or without further hetero atoms, or b) when X is nitrogen, are each $C_1-C_{10}$-alkyl which is unsubstituted or substituted by phenyl and may be interrupted by 1 oxygen atom in ether function, with the proviso that $Y^6$ and $Y^7$ are different in case b), and $Y^8$ is hydrogen or $Y^1$, one or more dyes (F2) which have their respective absorption maximum at a wavelength of from 410 to 530 nm and optionally one or more dyes (F3) which have their respective absorption maximum at a wavelength of from 600 to 700 nm, the FWHM value of the absorption maximum of the dyes F2 and F3 being at least 2000 cm$^{-1}$, to a process for the thermal transfer of these dyes and to a process for dyeing or printing synthetic materials.

In the thermal transfer printing process, a transfer sheet comprising a thermally transferable dye in one or more binders with or without suitable auxiliaries on a support is heated from the back with an energy source for example a thermal head or a laser, for short periods (duration: fractions of a second), which causes the dye to migrate out of the transfer sheet and diffuse into the surface coating of a receiving medium. The essential advantage of this process is that the amount of dye to be transferred (and thus the colour gradation) is easy to control by controlling the energy emitted by the energy source.

In general, color recording is carried out using the three subtractive primaries of yellow, magenta and cyan (with or without black).

It is known to carry out the thermal transfer printing process with individual dyes or else with mixtures of dyes. However, it has been found that the dyes used frequently still have application defects.

It is an object of the present invention to provide novel dye mixtures in the black region of the spectrum which shall be advantageously suitable for thermal transfer.

We have found that this object is achieved by the dye mixtures defined at the beginning.

Any alkyl or alkenyl appearing in the abovementioned formulae may be straight-chain or branched.

Any substituted alkyl appearing in the abovementioned formulae generally contains 1 or 2 substituents.

Any substituted alkyl appearing in the abovementioned formulae generally contains 1 or 2 substituents.

Any substituted phenyl, pyridyl or thienyl appearing in the abovementioned formulae generally contains from 1 to 3, preferably 1 or 2, substituents.

There follows a list of examples of radicals as defined in the formulae. It also includes radicals present in below-stated formulae.

Alkyl is for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl, isodecyl (the designations isooctyl, isononyl and isodecyl are trivial names derived from the oxo process alcohols—cf. Ullmann's Encyclopedia of Industrial Chemistry, $5^{th}$ Edition, Vol. A 1, pages 290 to 293, and also Vol. A 10, pages 284 and 285), 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3- propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl, 3,6,9,12-tetraoxatetradecyl, 2-methoxycarbonylethyl, 2-ethoxycarbonylethyl, 2-propoxycarbonylethyl, 2-isopropoxycarbonylethyl, 2-butoxycarbonylethyl, 2- or 3-methoxycarbonylpropyl, 2- or 3-ethoxycarbonylpropyl, 2- or 3-propoxycarbonylpropyl, 2- or 3-butoxycarbonylpropyl, 2- or 4-methoxycarbonylbutyl, 2- or 4-ethoxycarbonylbutyl, 2- or 4-propoxycarbonylbutyl, 2- or 4-butoxycarbonylbutyl, 2-methoxycarbonyloxyethyl, 2-ethoxycarbonyloxyethyl, 2-propoxycarbonyloxyethyl, 2-isopropoxycarbonyloxyethyl, 2-butoxycarbonyloxyethyl, 2- or 3-methoxycarbonyloxypropyl, 2- or 3-ethoxycarbonyloxypropyl, 2 or 3-propoxycarbonyloxypropyl, 2- or 3-butoxycarbonyloxypropyl, 2- or 4-methoxycarbonyloxybutyl, 2- or 4-ethoxycarbonyloxybutyl, 2- or 4-propoxycarbonyloxybutyl, 2- or 4-butoxycarbonyloxybutyl, benzyl, 2-phenylethyl, 2-, 3- or 4-methylbenzyl, 2-, 3- or 4-methoxybenzyl, 2-, 3- or 4-nitrobenzyl, 2-hydroxyethyl, 2- or 3-hydroxypropyl or 2- or 4-hydroxybutyl.

Alkenyl is for example prop-1-en-3-yl, but-2-en-4-yl or 2-methylprop-1-en-3-yl.

Cycloalkyl is for example cyclopentyl, methylcyclopentyl, dimethylcyclopentyl, cyclohexyl, methylcyclohexyl or cycloheptyl.

Phenyl is for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,3-, 2,4- or 2,6-dimethylphenyl, 2-, 3- or 4-methoxyphenyl, 2-, 3- or 4-ethoxyphenyl, 2,3-, 2,4- or 2,6-dimethoxyphenyl, 2-, 3- or 4-fluorophenyl, 2-, 3- or 4-chlorophenyl, 2-, 3- or 4-bromophenyl or 2-, 3- or 4-nitrophenyl.

Carbamoyl is for example mono- or dimethylcarbamoyl, mono- or diethylcarbamoyl, mono- or dipropylcarbamoyl, mono- or diisopropylcarbamoyl, mono- or dibutylcarbamoyl, phenylcarbamoyl, 2-methylphenylcarbamoyl or 2-nitrophenylcarbamoyl.

Alkylthio or phenylthio is for example methylthio, ethylthio, propylthio, isopropylthio, butylthio, isobutylthio, pentylthio, hexylthio, heptylthio, octylthio, isooctylthio, 2-ethylhexylthio, nonylthio, isononylthio, decylthio, isodecylthio, benzylthio, 1- or 2-phenylethylthio, phenylthio, 2-methylphenylthio, 2-methoxyphenylthio, 2-chlorophenylthio or 2-nitrophenylthio.

Alkoxy or alkenyloxy is for example methoxy, ethoxy, propoxy, isopropoxy, butoxy, isobutoxy, sec-butoxy, pentyloxy, isopentyloxy, neopentyloxy, tert-pentyloxy, hexyloxy, 2-methylpentyloxy, heptyloxy, octyloxy, isooctyloxy, 2-ethylhexyloxy, nonyloxy, isononyloxy, decyloxy, isodecyloxy, benzyloxy, 1- or 2-phenylethoxy, allyloxy or methallyloxy.

Halogen is for example fluorine, chlorine or bromine.

Alkylsulfonyl or phenylsulfonyl is for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, heptylsulfonyl, octylsulfonyl, 2-ethylhexylsulfonyl, phenylsulfonyl, 2-methylphenylsulfonyl, 2-methoxyphenylsulfonyl, 2-chlorophenylsulfonyl or 2-nitrophenylsulfonyl.

Alkoxycarbonyl or alkenyloxycarbonyl is for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl, hexyloxycarbonyl, heptyloxycarbonyl, octyloxycarbonyl, isooctyloxycarbonyl, 2-ethylhexyloxycarbonyl, 2-phenoxyethoxycarbonyl, 2- or 3-phenoxypropoxycarbonyl or 2- or 4-phenoxybutoxycarbonyl, allyloxycarbonyl or methallyloxycarbonyl.

Alkanoyl or benzoyl is for example formyl, acetyl, propionyl, butyryl, pentanoyl, hexanoyl, benzoyl, 2-, 3- or 4-methylbenzoyl, 2-, 3- or 4-methoxybenzoyl, 2-, 3- or 4-chlorobenzoyl or 2-, 3- or 4-nitrobenzoyl.

Alkanoylamino, benzoylamino, alkoxycarbonylamino, alkylsulfonylamino and mono- or dialkylaminosulfonylamino are each for example acetylamino, propionylamino, methoxyacetylamino, benzoylamino, methoxycarbonylamino, ethoxycarbonylamino, methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl)amino.

Sulfamoyl is for example methylsulfamoyl, ethylsulfamoyl, propylsulfamoyl, isopropylsulfamoyl, butylsulfamoyl, pentylsulfamoyl, hexylsulfamoyl, heptylsulfamoyl, octylsulfamoyl, 2-ethylsulfamoyl, 2-methoxyethylsulfamoyl, 2-ethoxyethylsulfamoyl, 3,6-dioxaheptylsulfamoyl, 3,6-dioxaoctylsulfamoyl, 4,8-dioxanonylsulfamoyl, 3,7-dioxaoctylsulfamoyl, 3,7-dioxanonylsulfamoyl, 4,7-dioxaoctylsulfamoyl, 4,7-dioxanonylsulfamoyl or 4,8-dioxadecylsulfamoyl.

$Y^1$ and $Y^2$ or $Y^6$ and $Y^7$ each combined with the nitrogen atom joining them together into a 5- or 6-membered saturated heterocyclic radical with or without further hetero atoms can be for example pyrrolidinyl, piperidinyl, morpholinyl, thiomorpholinyl, thiomorpholinyl S,S-dioxide, piperazinyl or N-($C_1$–$C_4$-alkyl)piperazinyl, such as N-methyl- or N-ethyl-piperazinyl.

If $Z^1$ is —CH=T, where T is derived from an acidic-CH compound $H_2T$, suitable acidic-CH compounds $H_2T$ include for example compounds of the formula

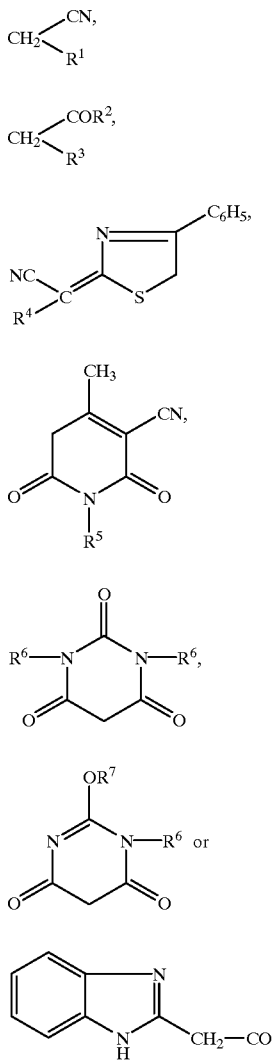

where
$R^1$ is cyano, nitro, $C_1$–$C_6$-alkanoyl, unsubstituted or $C_1$–$C_4$-alkyl-, $C_1$–$C_4$-alkoxy-, halogen- or nitro-substituted benzoyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl, $C_1$–$C_8$-alkoxycarbonyl, $C_3$–$C_4$-alkenyloxycarbonyl, phenoxycarbonyl, carbamoyl, mono- or di($C_1$–$C_4$-alkyl)carbamoyl, unsubstituted or $C_1$–$C_4$-alkyl-, $C_1$–$C_4$-alkoxy-, halogen- or nitro-substituted phenylcarbamoyl, unsubstituted or $C_1$–$C_4$-alkyl-, $C_1$–$C_4$-alkoxy-, halogen- or nitro-substituted phenyl, benzothiazol-2-yl, benzimidazol-2-yl, 5-phenyl-1,3,4-thiadiazol-2-yl or 2-hydroxyquinoxalin-3-yl, $R^2$ is $C_1$–$C_6$-alkyl, $C_1$–$C_6$-alkoxy or $C_3$–$C_4$-alkenyloxy, $R^3$ is $C_1$–$C_8$-alkoxycarbonyl, $C_3$–$C_4$-alkenyloxycarbonyl, phenylcarbamoyl or benzimidazol-2-yl, $R^4$ is cyano, $C_1$–$C_8$-alkoxycarbonyl or $C_3$–$C_4$-alkenyloxycarbonyl, $R^5$ is hydrogen or $C_1$–$C_6$-alkyl, $R^6$ is hydrogen, $C_1$–$C_6$-alkyl or phenyl, and $R^7$ is $C_1$–$C_6$-alkyl.

A particularly noteworthy radical is derived from compounds of the formula IIa, IIb or IIc where $R^1$ is cyano, $C_1$–$C_4$-alkanoyl, $C_1$–$C_8$-alkoxycarbonyl or $C_3$–$C_4$-alkenyloxycarbonyl, $R^2$ is $C_1$–$C_4$-alkyl, $C_1$–$C_4$-alkoxy or $C_3$–$C_4$-alkenyloxy, $R^3$ is $C_1$–$C_4$-alkoxycarbonyl or $C_3$–$C_4$-alkenyloxycarbonyl and $R^4$ is cyano.

A very particularly noteworthy radical is derived from compounds of the formula IIa, IIb or IIc where $R^1$ is cyano, $C_1$–$C_8$-alkoxycarbonyl or $C_3$–$C_4$-alkenyloxycarbonyl, $R^2$ is $C_1$–$C_4$-alkoxy or $C_2$–$C_4$-alkenyloxy, $R^3$ is $C_1$–$C_4$-alkoxycarbonyl or $C_3$–$C_4$-alkenyloxycarbonyl and $R^4$ is cyano.

Dyes F2 and F3 are preferably selected from the class of the monoazo, disazo, methine, azamethine, anthraquinone, nitro or quinophthalone dyes, particularly suitable dyes belonging to the class of the monoazo and/or methine dyes.

Suitable monoazo dyes are for example those whose diazo component is a member of the aminoisothiazoles or anilines and whose coupling component is a member of the aminothiazoles, anilines or tetrahydroquinolines.

Particularly suitable are azo dyes of the formula III $$D—N=N—K, \quad (III)$$

where K is as defined above and
D is a radical of the formula

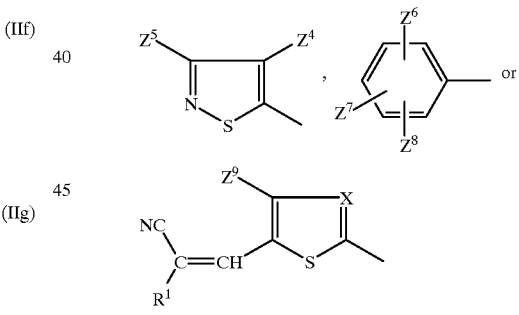

where
$Z^4$ is hydrogen, cyano, $C_1$–$C_8$-alkoxycarbonyl, $C_1$–$C_6$-alkanoyl, thiocyanato, halogen or nitro, $Z^5$ is cyano, unsubstituted or phenyl-substituted $C_1$–$C_6$-alkyl, unsubstituted or phenyl-substituted $C_1$–$C_{10}$-alkoxy, unsubstituted or phenyl-substituted $C_1$–$C_{10}$-alkylthio, unsubstituted or $C_1$–$C_4$-alkyl-, $C_1$–$C_4$-alkoxy-, halogen- or nitro-substituted phenyl, thienyl, $C_1$–$C_4$-alkylthienyl, pyridyl or $C_1$–$C_4$-alkylpyridyl, or $Z^4$ and $Z^5$ together are the radical of a fused-on benzene ring, $Z^6$, $Z^7$ and $Z^8$ are each independently of the other hydrogen, $C_1$–$C_6$-alkyl, $C_1$–$C_6$-alkoxy, halogen, nitro, cyano, unsubstituted or phenoxy-substituted $C_1$–$C_8$-alkoxycarbonyl, $C_1$–$C_8$-alkylsulfonyl or unsubstituted or $C_1$–$C_4$-alkyl-, $C_1$–$C_4$-alkoxy-, halogen- or nitro-substituted phenylsulfonyl, or $Z^3$ and $Z^4$ are together a radical of the formula CO—NW—CO, where W is $C_1$–$C_{10}$-alkyl with or without interruption by 1 or 2 oxygen atoms in ether function and with or without hydroxyl substitution, $Z^9$ is hydrogen, $C_1$–$C_6$-alkyl, $C_1$–$C_6$-alkoxy, halogen or unsubstituted or $C_1$–$C_4$-alkyl-, $C_1$–$C_4$-alkoxy-, halogen- or nitro-substituted phenyl, and $R^1$ and X are each as defined above.

Suitable disazo dyes conform for example to the formula IV

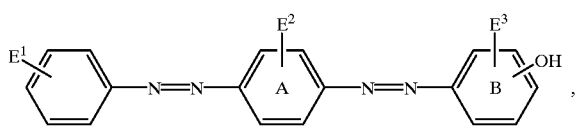
(IV)

where $E^1$ is hydrogen, $C_1$–$C_6$-alkyl or nitro, $E^2$ is hydrogen, $C_1$–$C_6$-alkyl or $C_1$–$C_6$-alkoxy, $E^3$ is hydrogen or $C_1$–$C_6$-alkyl and the rings A and B may each be benzofused.

Suitable methine dyes conform for example to the formulae V to VII

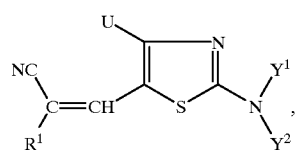
(V)

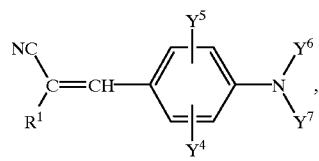
(VI)

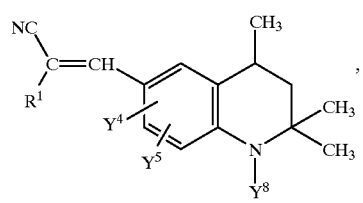
(VII)

where

U is hydrogen, halogen, $C_1$–$C_8$-alkyl, unsubstituted or $C_1$–$C_4$-alkyl-, $C_1$–$C_4$-alkoxy-, halogen- or nitro-substituted phenyl, unsubstituted or $C_1$–$C_4$-alkyl-, $C_1$–$C_4$-alkoxy-, halogen- or nitro-substituted benzyl, $C_5$–$C_7$-cycloalkyl, thienyl, hydroxyl or mono($C_1$–$C_8$-alkyl)amino, and $R^1$, $Y^1$, $Y^2$, $Y^4$, $Y^5$, $Y^6$, $Y^7$ and $Y^8$ are each as defined above.

Suitable azamethine dyes conform for example to the formula VIII or IX

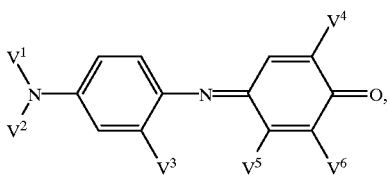
(VIII)

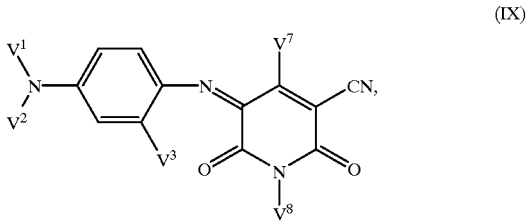
(IX)

where $V^1$, $V^2$, $V^7$ and $V^8$ are each independently of the others $C_1$–$C_6$-alkyl, $V^3$ is hydrogen or $C_1$–$C_8$-alkanoylamino, $V^4$ is $C_1$–$C_8$-alkanoylamino or $C_1$–$C_8$-mono- or dialkylcarbamoyl, $V^5$ is $C_1$–$C_4$-alkyl and $V^6$ is halogen or $V^5$ und $V^6$ together are the radical of a fused benzene ring.

Suitable anthraquinone dyes conform for example to the formula XI

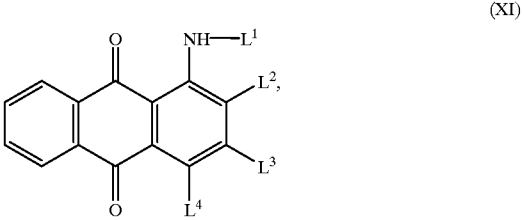
(XI)

where $L^1$ is hydrogen, $C_1$–$C_{10}$-alkyl or unsubstituted or $C_1$–$C_4$-alkyl-, $C_1$–$C_4$-alkoxy-, halogen- or nitro-substituted phenyl, $L^2$ and $L^3$ are independently of each other hydrogen, unsubstituted or phenyl- or $C_1$–$C_4$-alkylphenyl-substituted $C_1$–$C_{10}$-alkoxy, substituted or phenyl-substituted $C_1$–$C_{10}$-alkylthio, halogen, hydroxyphenyl, $C_1$–$C_4$-alkoxyphenyl or a radical of the formula

where $G^1$ is oxygen or sulfur and $G^2$ is hydrogen or mono($C_1$–$C_8$-alkyl)sulfamoyl whose alkyl chain may be interrupted by 1 or 2 oxygen atoms in ether function, and $L^4$ is amino, hydroxyl or unsubstituted or phenyl-substituted $C_1$–$C_{10}$-alkylthio.

Suitable quinophthalone dyes conform for example to the formula XII (XII)

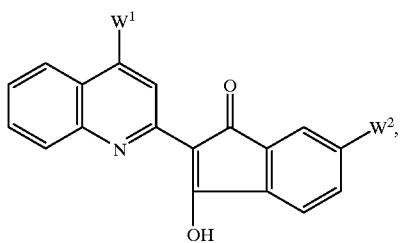

where
- $W^1$ is hydrogen or halogen and
- $W^2$ is hydrogen or $C_1$–$C_6$-alkyl.

Preference is given to dye mixtures comprising one or more azo dyes F1 of the formula I where $Z^1$ is cyano, $C_1$–$C_4$-alkanoyl or a radical of the formula —CH=C(CN)$_2$ or —CH=C(CN)COOQ, where Q is $C_1$–$C_8$-alkyl, and $Z^2$ is $C_1$–$C_4$-alkyl, halogen or $C_1$–$C_4$-alkoxy.

Preference is further given to dye mixtures comprising one or more azo dyes F1 of the formula I where K is a radical of the formula

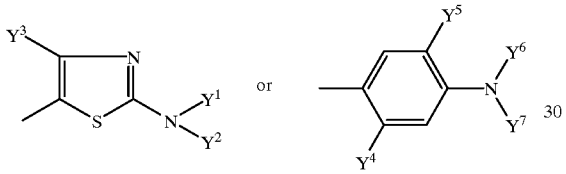

where
- $Y^1$ and $Y^2$ are independently of each other $C_1$–$C_{10}$-alkyl with or without interruption by 1 or 2 oxygen atoms in ether function and with or without phenyl substitution, or else $Y^1$ is hydrogen,
- $Y^3$ is $C_1$–$C_6$-alkyl, $C_5$–$C_7$-cycloalkyl, phenyl or thienyl,
- $Y^4$ is hydrogen or $C_1$–$C_6$-alkyl,
- $Y^5$ is hydrogen or $C_1$–$C_6$-alkoxy and
- $Y^6$ and $Y^7$ are independently of each other $C_1$–$C_{10}$-alkyl with or without interruption by 1 or 2 oxygen atoms in ether function and with or without phenyl substitution.

Preference is further given to dye mixtures comprising one or more azo dyes F1 of the formula I, where X is nitrogen or the radical C—CN.

Particular preference is given to dye mixtures comprising one or more azo dyes F1 of the formula I where $Z^1$ is cyano or formyl and $Z^2$ is $C_1$–$C_4$-alkyl, chlorine or $C_1$–$C_4$-alkoxy.

Particular preference is further given to dye mixtures comprising one or more azo dyes F1 of the formula I, where K is a radical of the formula

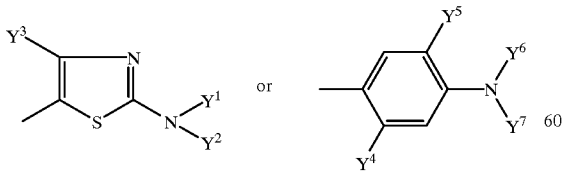

where
- $Y^1$ and $Y^2$ are independently of each other $C_1$–$C_{10}$-alkyl with or without interruption by 1 or 2 oxygen atoms in ether function,

- $Y^3$ is $C_1$–$C_6$-alkyl, phenyl or thienyl,
- $Y^4$ is hydrogen or $C_1$–$C_6$-alkyl,
- $Y^5$ is hydrogen or $C_1$–$C_4$-alkoxy, and
- $Y^6$ and $Y^7$ are independently of each other $C_1$–$C_{10}$-alkyl.

Of very particular industrial interest are dye mixtures comprising as dye F1 a dye of the formula Ia (Ia)

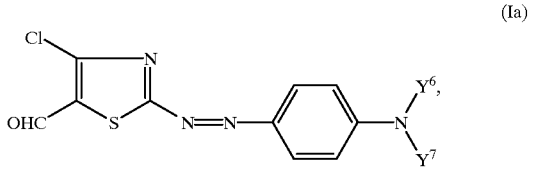

where $Y^6$ and $Y^7$ are independently of each other $C_1$–$C_4$-alkyl, the dye of the formula Ia where $Y^6$ is ethyl and $Y^7$ is propyl being particularly suitable.

Of particular interest are dye mixtures comprising as dyes F2 and optionally F3 one or more monoazo dyes of the formula III where
- $Z^4$ is hydrogen or cyano,
- $Z^5$ is unsubstituted or phenyl-substituted $C_1$–$C_6$-alkyl, unsubstituted or phenyl-substituted $C_1$–$C_6$-alkylthio or unsubstituted or $C_1$–$C_4$-alkyl-, $C_1$–$C_4$-alkoxy-, halogen- or nitro-substituted phenyl or thienyl,
- $Z^6$, $Z^7$ and $Z^8$ are each independently of the others hydrogen, $C_1$–$C_6$-alkyl, $C_1$–$C_6$-alkoxy, halogen, nitro, cyano or unsubstituted or phenoxy-substituted $C_1$–$C_6$-alkoxycarbonyl, $C_1$–$C_6$-alkylsulfonyl, or $Z^6$ and $Z^7$ are together a radical of the formula CO—NW—CO, where W is as defined above,
- $Z^9$ is $C_1$–$C_4$-alkoxy or halogen,
- $R^1$ is cyano or $C_1$–$C_4$-alkoxycarbonyl,
- X is nitrogen or the radical C—CN,
- $Y^1$, $Y^2$, $Y^6$ and $Y^7$ are each independently of the others $C_1$–$C_6$-alkyl with or without substitution by hydroxyl, $C_1$–$C_4$-alkanoyloxy, $C_1$–$C_4$-alkoxycarbonyl, $C_1$–$C_4$-alkoxycarbonyloxy or phenyl and with or without interruption by 1 or 2 oxygen atoms in ether function,
- $Y^3$ is $C_1$–$C_{10}$-alkyl, and
- $Y^4$ is hydrogen, $C_1$–$C_4$-alkyl, methoxy, ethoxy or $C_1$–$C_6$-alkanoylamino.

Particularly noteworthy are dye mixtures comprising as dyes F2 and optionally F3 one or more monoazo dyes of the formula IIIa or IIIb (IIIa)

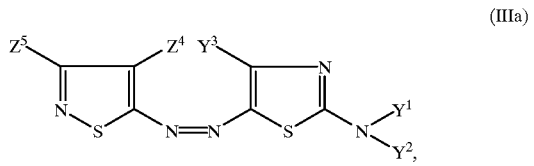

(IIIb)

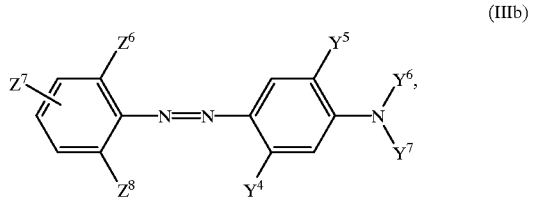

where
- $Y^1$, $Y^2$, $Y^6$ and $Y^7$ are each independently of the others $C_1$–$C_6$-alkyl with or without substitution by cyano, $C_1$–$C_4$-alkanoyloxy or $C_1$–$C_4$-alkoxycarbonyloxy, $Y^3$ is $C_1$–$C_6$-alkyl, phenyl or thienyl,
$Y^4$ is hydrogen or $C_1$–$C_6$-alkyl,
$Y^5$ is hydrogen, $C_1$–$C_6$-alkyl or $C_1$–$C_6$-alkoxy,
$Z^4$ is hydrogen or cyano,
$Z^5$ is $C_1$–$C_4$-alkyl or phenyl, or
$Z^6$, $Z^7$ and $Z^8$ are each independently of the others hydrogen, nitro, cyano or halogen.

Also particularly noteworthy are dye mixtures comprising as dyes F2 and optionally F3 one or more disazo dyes of the formulae (IVa)

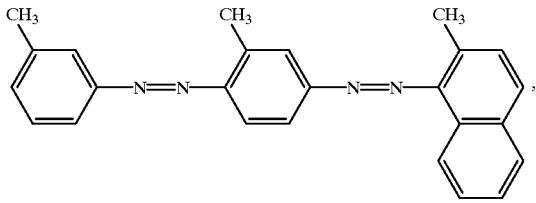

(IVb)

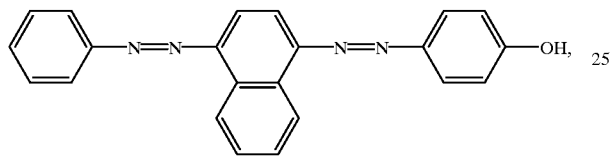

(IVc)

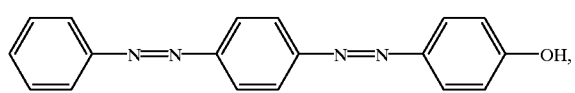

(IVd)

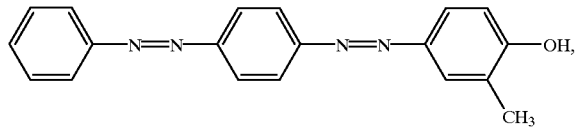

or (IVe)

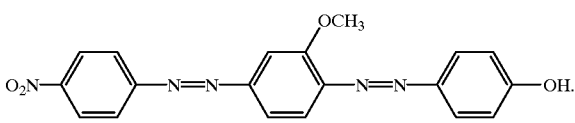

Also particularly noteworthy are dye mixtures comprising as dyes F2 and optionally F3 one or more methine dyes of the formula Va (Va)

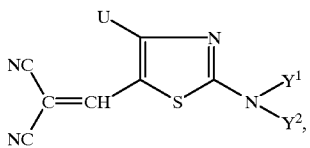

where
U is unsubstituted or $C_1$–$C_4$-alkyl- or $C_1$–$C_4$-alkoxy-substituted phenyl, and
$Y^1$ and $Y^2$ are independently of each other $C_1$–$C_6$-alkyl with or without substitution by hydroxyl, $C_1$–$C_4$-alkanoyloxy, $C_1$–$C_4$-alkoxycarbonyl, $C_1$–$C_4$-alkoxycarbonyloxy or phenyl and with or without interruption by 1 or 2 oxygen atoms in ether function.

Also particularly noteworthy are dye mixtures comprising as dyes F2 and optionally F3 one or more anthraquinone dyes of the formula XI where $L^1$ is hydrogen and $L^4$ is hydroxyl and $L^2$ and $L^3$ are each as defined above.

Also particularly noteworthy are dye mixtures comprising as dyes F2 and optionally F3 one or more anthraquinone dyes of the formula XI where $L^2$ and/or $L^3$ is a radical of the formula

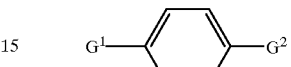

where $G^1$ and $G^2$ are each as defined above.

Also particularly noteworthy are dye mixtures comprising as dyes F2 and optionally F3 one or more anthraquinone dyes of the formula XIa (XIa)

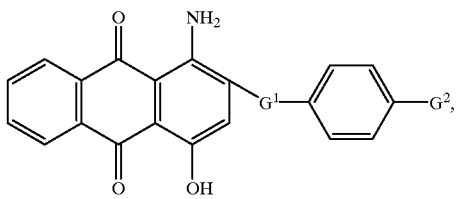

where $G^1$ and $G^2$ are each as defined above.

Of importance are dye mixtures comprising one or more dyes F2 and one or more dyes F3.

Of particular importance are dye mixtures comprising as dyes F2 and F3 one or more dyes selected from the class of the monoazo and/or methine dyes.

Also of particular importance are dye mixtures comprising one or more dyes of the formula I and as dyes F2 and F3 one or more dyes selected from the class of the monoazo dyes, especially those of the formula III, and/or one or more methine dyes, especially those of the formula V, VI or VII.

Preference is in addition given to dye mixtures in which the substituents in the formulae are selected from a combination of the above-recited preferred substituents.

The dye mixtures of this invention generally comprise from 30 to 70% by weight of one or more dyes F1 and from 30 to 70% by weight of one or more dyes F2 and optionally F3, based on the weight of the dye mixture.

The dye mixtures of this invention preferably comprise from 20 to 50% by weight of one or more dyes F1, from 20 to 50% by weight of one or more dyes F2 and from 10 to 50% by weight of one or more dyes F3, based on the weight of the dye mixture, the sum of the individual dyes of course being 100% by weight.

The dye mixtures of this invention preferably comprise from one to three dyes F1, one dye F2 and one or two dyes F3.

Of particular importance are dye mixtures in which the components F1 and F2 and optionally F3 are adapted to each other in such a way that their thermal transfer produces gray or black prints possessing minimal CIELAB chroma.

The novel dye mixtures can be obtained by methods known per se, for example by mixing the individual dyes in the abovementioned weight ratio.

The dyes present in the mixtures are known per se or can be prepared in a manner known per se.

They are described for example in DE-A-3 108 077, EP-A-201 896, EP-A-235 939, EP-A-390 027, EP-A-546 403, WO-A-96/03462, U.S. Pat. No. 4,764,178, EP-A-509 302, EP-A-416 434, EP-A-83 553 and in K. Venkataraman "The Chemistry of Synthetic Dyes", Vol. III, pages 391 to 413, Academic Press, New York, London, 1970.

The dye mixtures of this invention have advantageous application properties. They exhibit high solubility in the ribbon (good compatibility with the binder), high stability in the printing ink, good transferability, high image stability (ie. good lightfastness and also good stability to environmental effects, eg. moisture, temperature or chemicals) and ensure flexible coloristic conformation to the remaining subtractive primaries, which results in high quality color spaces.

A particularly noteworthy feature is the spectrally uniform degradation of the individual components on irradiation; that is, the individual dye with the lower lightfastness generally does not degrade preferentially.

The present invention further provides a process for transferring dyes from a support to a plastic-coated paper by diffusion or sublimation with the aid of an energy source, which comprises using a support comprising a dye mixture specified in the introduction.

To make the supports required for the process of the present invention, the dye mixtures are incorporated in a suitable organic solvent or in mixtures of solvents with one or more binders, optionally in the presence of assistants, to form a printing ink. This printing ink preferably includes the dyes in a molecularly disperse, ie. dissolved, form. The printing ink can be applied to the inert support by means of a suspended knife and air-dried. Suitable organic solvents for the dye mixtures are for example those in which the solubility of the dye mixtures at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymeric materials which are soluble in organic solvents and which are capable of binding the dye mixtures to the inert support sufficiently firmly to prevent rubbing off. Preference is given to those binders which, after the air-drying of the printing ink, include the dye mixture in the form of a clear, transparent film without any visible sign of crystallization of the dye mixture.

Such binders are mentioned for example in U.S. Pat. No. 5,132,438 or pertinent patent applications cited therein. Also suitable are saturated linear polyesters.

Preferred binders are ethylcellulose, ethylhydroxyethylcellulose, polyvinyl butyral, polyvinyl acetate, cellulose propionate or saturated linear polyesters.

The weight ratio of binder:dye mixture generally ranges from 1:1 to 10:1.

Suitable assistants are for example release agents as mentioned in U.S. Pat. No. 5,132,438 or pertinent patent applications cited therein. Also suitable are especially organic additives which prevent the crystallizing out of the transfer dyes in the course of storage or on heating the ink ribbon, for example cholesterol or vanillin.

Suitable inert supports are described for example in U.S. Pat. No. 5,132,438 or pertinent patent applications cited therein. The thickness of the support generally ranges from 3 to 30 $\mu$m, preferably from 5 to 10 $\mu$m.

Suitable dye receiver layers include in principle all thermally stable plastics layers with affinity for the dyes to be transferred, for example modified polycarbonates or polyesters. Further details may be obtained for example from U.S. Pat. No. 5,132,438 or pertinent patent applications cited therein.

The transfer process is effected by means of an energy source, for example by means of a laser or a thermal head, for which the latter has to be heatable to a temperature of $\geq 300°$ C. in order that the dye transfer may take place within the time range t: $0<t<15$ msec. The dye transfers by migrating out the transfer sheet and diffusing into the surface coating of the receiving medium.

The dye mixtures of this invention are also advantageously useful for dyeing or printing (including inkjet printing) synthetic materials, for example polyesters, polyamides or polycarbonates. Particularly suitable substrates are textile materials, such as fibers, yarns, threads, knits, wovens or nonwovens composed of polyester, modified polyester, for example anionically modified polyester, or blends of polyester with cellulose, cotton, viscose or wool. The dyeing and printing conditions are known per se and also include dyeing in supercritical carbon dioxide. The dyes of this invention can also be used for dyeing keratinous fibers, for example in the dyeing of hair or furs.

The novel dye mixtures are also advantageously useful for making color filters as described for example in EP-A-399 473.

Finally they can also be used with advantage as colorants for making toners for electrophotography.

The Examples which follow illustrate the invention.

There first follows a list of the individual dyes used as mixing partners.

TABLE 1

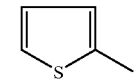

| Dye No. | $Z^1$ | $Z^2$ | X | $Y^3$ | $N\begin{smallmatrix}Y^1\\Y^2\end{smallmatrix}$ |
|---|---|---|---|---|---|
| 1 | CHO | Cl | CCN | 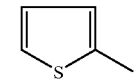 | $N\begin{smallmatrix}C_3H_7\\C_3H_6OC_2H_4OCH_3\end{smallmatrix}$ |
| 2 | CN | $CH_3$ | CCN | $C_6H_5$ | $N\begin{smallmatrix}C_2H_5\\C_3H_6OC_2H_4OCH_3\end{smallmatrix}$ |
| 3 | CN | $CH_3$ | $CCO_2C_2H_5$ |  | $N\begin{smallmatrix}C_2H_5\\C_3H_6OC_2H_4OCH_3\end{smallmatrix}$ |
| 4 | CHO | Cl | CCN | $C_6H_5$ | $N\begin{smallmatrix}C_2H_5\\C_3H_6OCH_3\end{smallmatrix}$ |
| 5 | CHO | Cl | CCN | 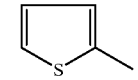 | $N(C_4H_9)_2$ |
| 6 | CHO | $OC_2H_5$ | CCN | 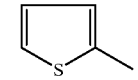 | $N(C_4H_9)_2$ |
| 7 |  | Cl | CCN | $C(CH_3)_3$ | $N(C_4H_9)_2$ |
| 8 | CN | $CH_3$ | $CCO_2CH_3$ |  | $N\begin{smallmatrix}C_2H_5\\C_3H_6OCH_3\end{smallmatrix}$ |

TABLE 2

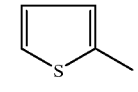

| Dye No. | $Z^1$ | $Z^2$ | X | $Y^4$ | $Y^5$ | $N\begin{smallmatrix}Y^6\\Y^7\end{smallmatrix}$ |
|---|---|---|---|---|---|---|
| 9 | CHO | Cl | CCN | H | H | $N\begin{smallmatrix}CH_3\\C_3H_7\end{smallmatrix}$ |
| 10 | CHO | Cl | CCN | H | H | $N\begin{smallmatrix}CH_3\\C_4H_9\end{smallmatrix}$ |
| 11 | CHO | Cl | CCN | $C(CH_3)_3$ | H | $N(C_2H_5)_2$ |

TABLE 2-continued

Structure: Z²-, Z¹- on thiazole (X, S) connected via N=N to benzene ring with Y⁵, Y⁴, and NY⁶Y⁷ group

| Dye No. | Z¹ | Z² | X | Y⁴ | Y⁵ | N(Y⁶)(Y⁷) |
|---|---|---|---|---|---|---|
| 12 | CHO | Cl | CCN | CH₃ | H | N(C₂H₅)(C₂H₄CH(CH₃)₂) |
| 13 | CHO | Cl | CCN | C₂H₅ | H | N(C₆H₁₃)₂ |
| 14 | CHO | Cl | CCN | C(CH₃)₃ | OCH₃ | NHCH(CH₃)C₃H₇ |
| 15 | CHO | Cl | N | H | H | N(C₂H₅)(C₂H₄CH(CH₃)₂) |
| 16 | CN | CH₃ | CCN | C₂H₅ | H | N(C₄H₉)₂ |
| 17 | CHO | CH₃ | CCN | CH₃ | OCH₃ | N(C₄H₉)₂ |
| 18 | CHO | Cl | CCN | H | H | N(C₂H₅)(C₈H₁₇) |
| 19 | CHO | OC₂H₅ | CCN | CH₃ | H | N(C₂H₅)(C₂H₄CH(CH₃)₂) |
| 20 | CHO | OC₂H₅ | CCN | H | H | N(C₄H₉)(C₆H₁₃) |
| 21 | CHO | Cl | CCN | H | H | N(CH₃)(C₆H₁₃) |
| 22 | CHO | Cl | CCN | CH(CH₃)₂ | H | N(C₄H₉)₂ |
| 23 | CHO | Cl | N | CH₃ | H | N(C₆H₁₃)₂ |
| 24 | CHO | Cl | N | H | H | N(C₂H₅)(C₂H₄CH(CH₃)₂) |
| 25 | CHO | Cl | N | C(CH₃)₃ | OCH₃ | NHCH(CH₃)C₄H₉ |
| 26 | CHO | Cl | N | H | H | N(C₂H₅)(C₃H₆OCH₃) |
| 27 | CHO | Cl | N | CH₃ | H | N(C₂H₅)(C₆H₁₃) |
| 28 | CHO | Cl | N | H | H | N(C₂H₅)(C₂H₄OC₄H₉) |
| 29 | NO₂ | Cl | CCN | C(CH₃)₃ | H | N(C₄H₉)₂ |
| 30 | CN | Cl | CCN | C(CH₃)₃ | OCH₃ | NHCH(CH₃)C₃H₇ |

TABLE 3

Structure: thiazole-azo-tetrahydroquinoline with substituents Z¹, Z², X, Y⁴, Y⁸

| Dye No. | Z¹ | Z² | X | Y⁴ | Y⁸ |
|---|---|---|---|---|---|
| 31 | CHO | Cl | CCN | C(CH₃)₃ | C₄H₉ |
| 32 | CHO | Cl | CCN | H | C₂H₅ |
| 33 | CHO | CH₃ | CCN | H | C₂H₅ |
| 34 | CHO | Cl | CCN | H | C₂H₅ |

TABLE 4

Structure: isothiazole-azo-thiazole with substituents Z⁵, Z⁴, Y³, and NY¹Y²

| Dye No. | Z⁴ | Z⁵ | Y³ | N(Y¹)(Y²) |
|---|---|---|---|---|
| 35 | CN | CH₃ | C(CH₃)₃ | N(CH₂C₆H₅)₂ |
| 36 | (fused ring) | | C(CH₃)₃ | N(C₂H₅)₂ |
| 37 | CN | C₆H₅ | C(CH₃)₃ | N(C₄H₉)₂ |
| 38 | H | CH₃ | C(CH₃)₃ | N(C₄H₉)₂ |

TABLE 5

Structure: bis-phenyl azo dye with substituents Z³, Z⁶, Z⁸, Y⁸, Y⁵, Y⁴, and NY⁶Y⁷

| Dye No. | Z⁶ | Z⁷ | Z⁸ | Y⁴ | Y⁵ | Y⁸ | N(Y⁶)(Y⁷) |
|---|---|---|---|---|---|---|---|
| 39 | H | NO₂ | H | H | OCH₃ | H | N(C₄H₉)₂ |
| 40 | Cl | NO₂ | Cl | CH₃ | H | CH₃ | N(C₄H₉)₂ |
| 41 | H | NO₂ | H | H | OCH₃ | H | NHCH(CH₃)₂ |
| 42 | H | NO₂ | H | H | CH(CH₃)₂ | H | pyrrolidinyl |
| 43 | Cl | CN | H | H | H | H | pyrrolidinyl |

TABLE 6
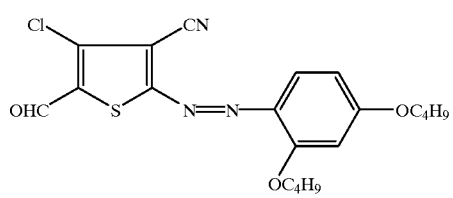
| Dye No. | $Z^6$ | $Z^7$ | $Z^8$ | $Y^3$ | $N\begin{smallmatrix}Y^1\\Y^2\end{smallmatrix}$ |
|---|---|---|---|---|---|
| 44 | CN | H | CN | $C(CH_3)_3$ | $N(C_4H_9)_2$ |
| 45 | CN | H | CN | $C(CH_3)_3$ | $N(C_2H_5)_2$ |
| 46 | H | $NO_2$ | H | $C(CH_3)_3$ | $N(C_4H_9)_2$ |
Dye No. 47
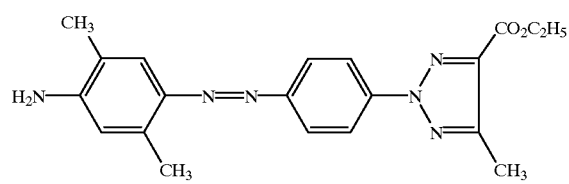
Dye No. 48
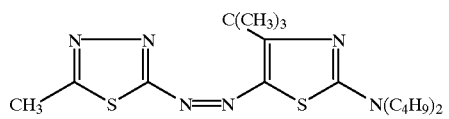
Dye No. 49
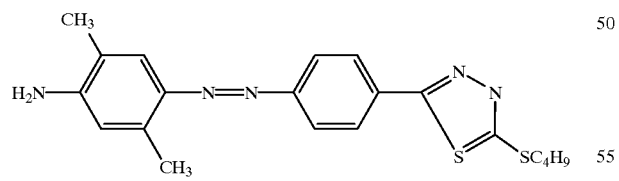
Dye No. 50
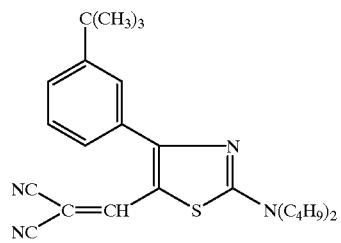
Dye No. 51
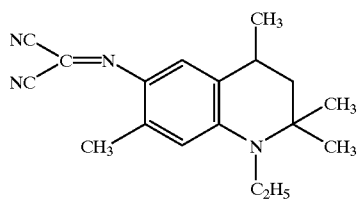
Dye No. 52
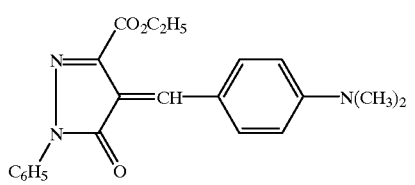
Dye No. 53
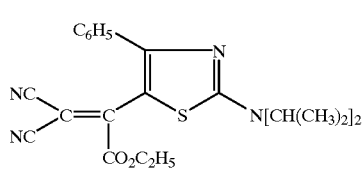
Dye No. 54
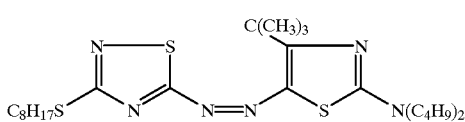
Dye No. 55
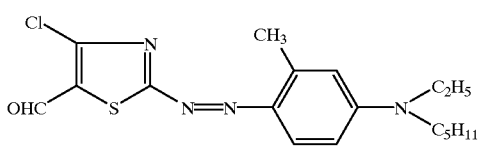
Dye No. 56
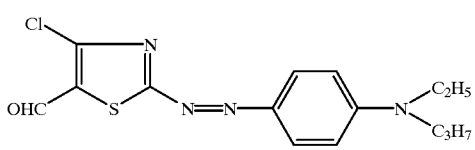
Dye No. 57
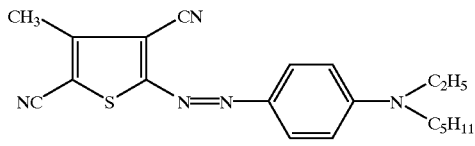
Dye No. 58
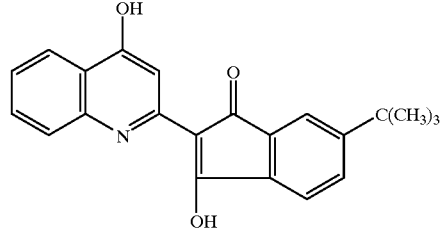
Dye No. 59

Dye No. 60
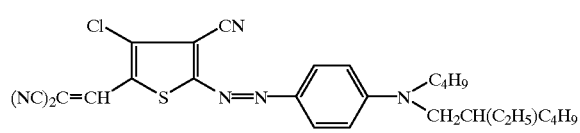
Dye No. 61
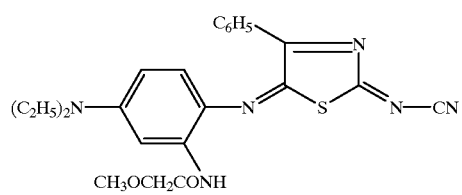
Dye No. 62
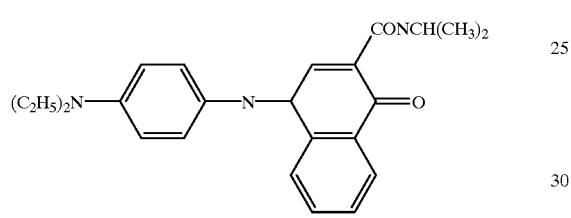
Dye No. 63
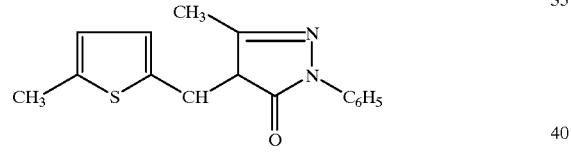
Dye No. 64
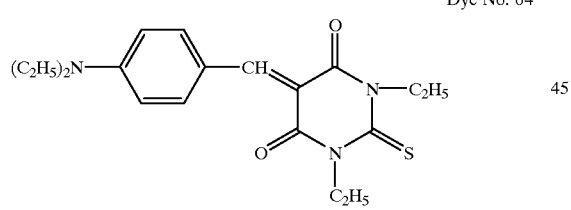
Dye No. 65
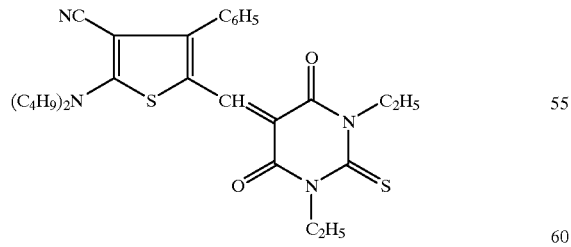
Dye No. 66
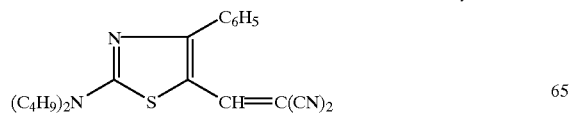
Dye No. 67
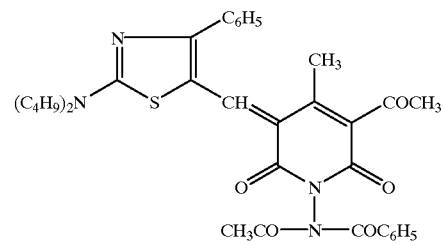
Dye No. 68
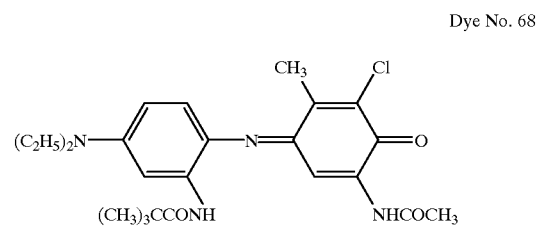
Dye No. 69
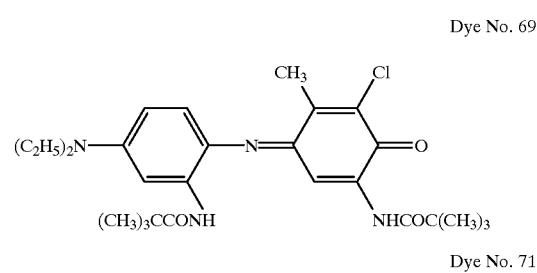
Dye No. 71
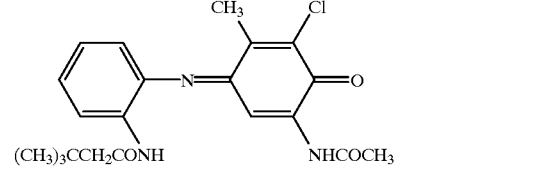
Dye No. 72
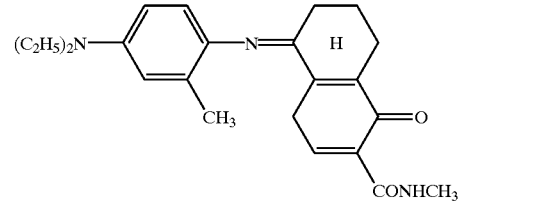
Dye No. 73
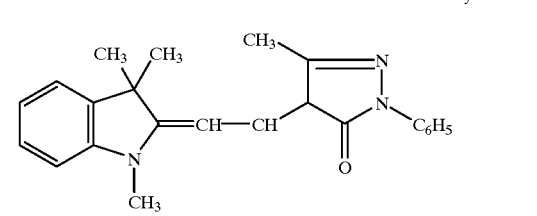
Dye No. 74
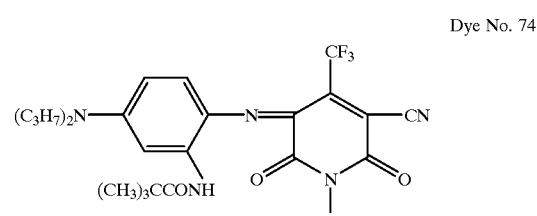

Dye No. 75
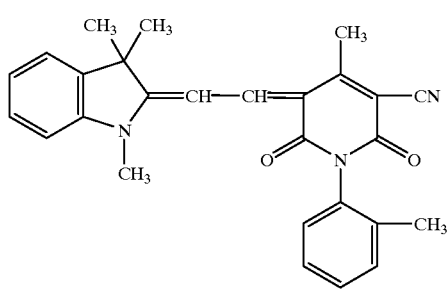
Dye No. 76
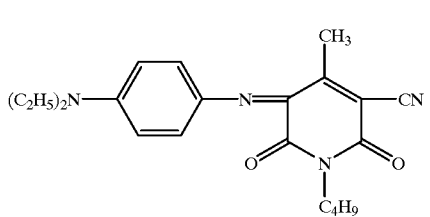
Dye No. 77
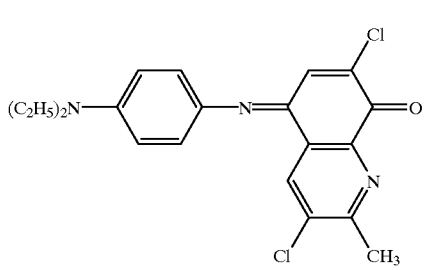
Dye No. 78
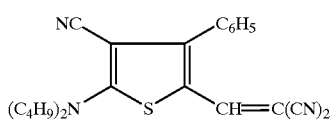
Dye No. 79
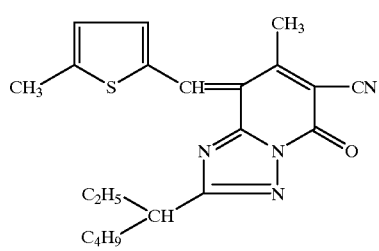
Dye No. 80
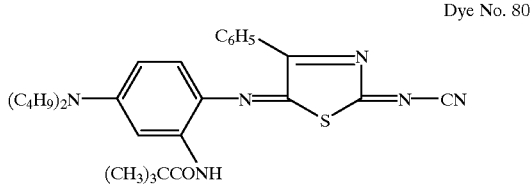
Dye No. 81
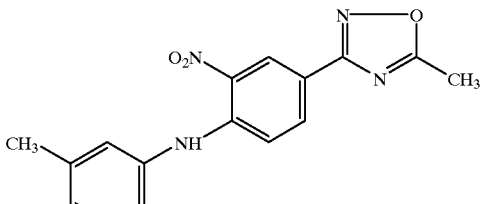
Dye No. 82
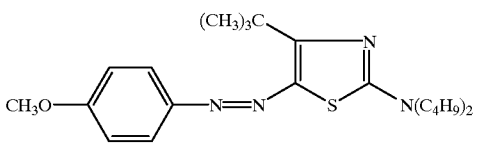
Dye No. 83
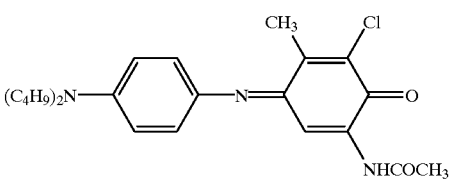
Dye No. 84
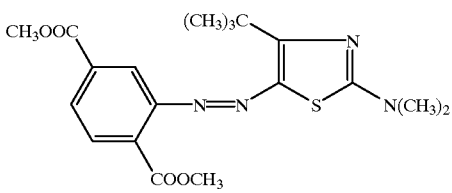
Dye No. 85
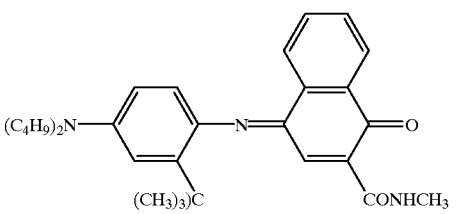
Dye No. 86
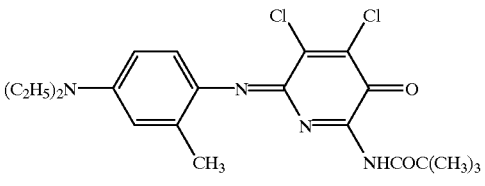
Dye No. 87
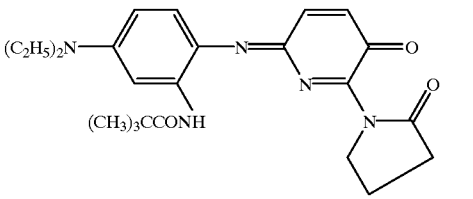

-continued

Dye No. 88
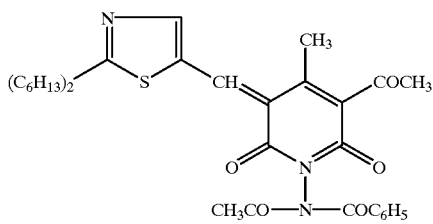

Dye No. 89
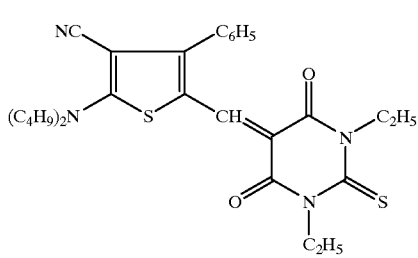

Dye No. 90
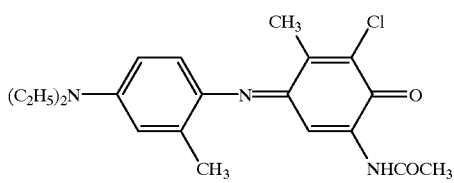

TABLE 7

Dye mixtures

| Mixture No. | Dye No. | Weight ratio |
|---|---|---|
| 1 | 1/35/51 | 1.7:1.0:0.75 |
| 2 | 2/35/51 | 1.5:0.8:1.4 |
| 3 | 3/35/51 | 1.6:0.7:1.3 |
| 4 | 4/35/51 | 1.7:0.5:1.4 |
| 5 | 5/35/51 | 1.8:1.0:0.7 |
| 6 | 9/40/51 | 1.6:1.8:0.4 |
| 7 | 10/40/51 | 1.0:1.2:0.3 |
| 8 | 5/36/38 | 1.4:1.0:1.1 |
| 9 | 6/39 | 1.3:1.0 |
| 10 | 5/40 | 1.0:1.0 |
| 11 | 7/40 | 1.0:1.1 |
| 12 | 11/40 | 1:1.05 |
| 13 | 12/40 | 1.0:1.0 |
| 14 | 11/47 | 1.23:1.0 |
| 15 | 11/41 | 1.25:1.0 |
| 16 | 15/48 | 1.15:1.0 |
| 17 | 13/40 | 1.0:1.15 |
| 18 | 14/40 | 1.0:1.05 |
| 19 | 13/47 | 1.2:1.0 |
| 20 | 13/49 | 1.32:1.0 |
| 21 | 16/44 | 1.0:1.0 |
| 22 | 17/45 | 1.0:1.0 |
| 23 | 31/45 | 1.0:1.0 |
| 24 | 31/44 | 1.0:1.0 |
| 25 | 32/42 | 1.0:1.15 |
| 26 | 32/40 | 1.0:1.15 |
| 27 | 14/53 | 1.3:1.0 |
| 28 | 13/53 | 1.3:1.0 |
| 29 | 15/51 | 1.25:1.0 |
| 30 | 12/52 | 1.0:0.5 |
| 31 | 33/35/51 | 1.8:1.0:1.3 |
| 32 | 33/55/51 | 1.3:1.0:0.8 |
| 33 | 18/39 | 1.0:2.0 |
| 34 | 18/39 | 1.0:1.5 |
| 35 | 18/39 | 1.0:1.0 |

TABLE 7-continued

Dye mixtures

| Mixture No. | Dye No. | Weight ratio |
|---|---|---|
| 36 | 18/39 | 1.5:1.0 |
| 37 | 18/39 | 2.0:1.0 |
| 38 | 18/50 | 1.0:1.0 |
| 39 | 18/50 | 1.5:1.0 |
| 40 | 18/50 | 2.0:1.0 |
| 41 | 19/40 | 1.0:1.0 |
| 42 | 19/40 | 1.0:1.2 |
| 43 | 20/40 | 1.0:1.0 |
| 44 | 12/46 | 1.2:0.95 |
| 45 | 21/46 | 1.25:0.95 |
| 46 | 22/47 | 1.15:0.90 |
| 47 | 13/47 | 1.25:1.0 |
| 48 | 23/44 | 1.0:1.0 |
| 49 | 25/54 | 1.3:1.0 |
| 50 | 24/46 | 1.32:0.85 |
| 51 | 26/41 | 1.0:1.0 |
| 52 | 56/44 | 1.32:0.85 |
| 53 | 27/45 | 1.0:1.0 |
| 54 | 28/44 | 1.0:1.0 |
| 55 | 27/44 | 1.0:1.0 |
| 56 | 8/35/51 | 1.6:0.6:1.3 |
| 57 | 7/35/51 | 1.7:1.0:0.9 |
| 58 | 7/41 | 1.1:1.0 |
| 59 | 6/39/51 | 1.3:1.4:0.25 |
| 60 | 29/39/51 | 1.8:1.5:0.4 |
| 61 | 5/37/38 | 2.0:1.0:1.0 |
| 62 | 30/46 | 1.2:1.0 |
| 63 | 14/47 | 1.25:1.0 |
| 64 | 14/43 | 1.25:1.0 |
| 65 | 23/44 | 1.0:1.0 |
| 66 | 34/38 | 1.2:1.0 |
| 67 | 7/39/51 | 1.7:1.6:0.4 |
| 68 | 6/41 | 1.2:1.0 |
| 69 | 48/56 | 1.0:1.15 |
| 70 | 51/56 | 1.0:1.25 |
| 71 | 24/48 | 1.15:1.0 |
| 72 | 24/51 | 1.25:1.0 |
| 73 | 24/80/84 | 1.0:1.4:1.0 |
| 74 | 56/82/87 | 1.0:1.2:1.0 |
| 75 | 56/79 | 1.3:0.9 |
| 76 | 24/78 | 1.3:1.0 |
| 77 | 24/81 | 1.3:1.0 |
| 78 | 56/73/85 | 1.0:1.0:1.4 |
| 79 | 24/73/77 | 0.8:1.3:1.5 |
| 80 | 24/59/61/88 | 1.2:0.8:3.04:0.95 |
| 81 | 56/60/64/66 | 1.04:3.04:0.95:0.85 |
| 82 | 24/66/69 | 1.0:1.0:1.4 |
| 83 | 57/69/73 | 1.17:1.69:0.9 |
| 84 | 56/70/73 | 1.0:1.0:1.1 |
| 85 | 24/75/76 | 1.8:0.4:1.4 |
| 86 | 24/68/75/76 | 1.8:0.7:0.4:1.4 |
| 87 | 56/74/76 | 1.0:1.2:0.7 |
| 88 | 58/71/73 | 0.8:1.4:0.95 |

Thermal transfer method:
a) 10 g of dye mixture are stirred, if necessary with brief heating to 80–90° C., into 100 g of a 10% strength by weight solution of a binder based on polyvinyl butyral in a methyl ethyl ketone/toluene/cyclohexanone mixture (4.5:2:2 v/v/v).

The mixture is applied with a 10 μm knife to a 6 μm thick polyester film which has a suitable slipping layer on the back and is blown dry with a hairdryer in the course of 1 minute. Before the ink ribbon can be printed, it has to be air-dried for at least a further 24 hours, since solvent residues can impair the printing process.

b) The ink ribbons are printed on an experimental computer-controlled apparatus equipped with a commercial thermal head onto commercial videoprint paper from Hitachi.

The voltage is altered to control the energy emitted by the thermal head, the length of the pulse having been set to 7 ms and only one pulse being emitted at a time. The emitted energy ranges from 0.5 to 2.0 mJ/dot.

Since the depth of color is directly proportional to the supplied energy, it is possible to produce a color wedge for spectroscopic evaluation.

The depth of color is plotted against the supplied energy per heating element to determine the Q* value (=energy in mJ for the absorbance value of 1) and the gradient m in 1/mJ.

The results obtained are listed together with the $\lambda_{max}$ values (measured on the heated videoprint paper) and the lightfastness (LF) values below in Table 8.

The lightfastness value reported is the number of hours of irradiation whereafter 20% of the amount of dye originally present were destroyed.

The Q* and m values were measured on prints heated at 120° C. for 90 seconds. The lightfastness was determined on unheated prints.

TABLE 8

| Mixture No. | $\lambda_{max}$ [nm] | LF (h) | $Q*\left[\dfrac{mJ}{dot}\right]$ | $m\left[\dfrac{1}{mJ}\right]$ |
|---|---|---|---|---|
| 1 | 535 | 27 | | |
| 2 | 551 | 21 | | |
| 3 | 548 | 19 | | |
| 4 | 574 | 18 | | |
| 5 | 547 | 16 | | |
| 6 | 579 | 16 | | |
| 8 | 625 | 30 | | |
| 9 | 603 | 11 | | |
| 10 | 640 | 50 | 1.17 | 1.13 |
| 11 | 639 | 50 | 1.15 | 1.11 |
| 12 | 623 | 17 | 0.94 | 2.68 |
| 13 | 619 | 20 | 0.80 | 1.83 |
| 14 | 620 | 11 | 0.95 | 2.12 |
| 15 | 622 | 12 | 0.94 | 2.23 |
| 16 | 580 | 13 | 1.07 | 1.71 |
| 17 | 620 | 32 | 0.99 | 1.99 |
| 18 | 621 | 40 | 1.02 | 2.44 |
| 19 | 622 | 13 | 0.96 | 1.41 |
| 20 | 621 | 11 | 1.00 | 2.31 |
| 21 | 581 | 15 | 0.99 | 2.25 |
| 22 | 527 | 14 | 0.98 | 2.15 |
| 23 | 644 | 22 | 1.10 | 1.74 |
| 24 | 644 | 15 | 1.08 | 1.81 |
| 25 | 623 | 10 | 1.03 | 2.09 |
| 26 | 621 | 32 | 0.98 | 2.16 |
| 27 | 629 | 20 | 0.95 | 2.52 |
| 28 | 617 | 16 | 0.96 | 2.32 |
| 29 | 573 | 15 | 0.95 | 2.62 |
| 30 | 619 | 14 | 0.70 | 2.27 |
| 31 | 627 | 13 | | |
| 32 | 615 | 9 | | |
| 33 | 534 | 7 | | |
| 34 | 564 | 9 | | |
| 35 | 566 | 9 | | |
| 36 | 583 | 12 | | |
| 37 | 590 | 14 | | |
| 38 | 610 | 10 | | |
| 39 | 606 | 13 | | |
| 40 | 604 | 13 | | |
| 41 | 596 | 20 | | |
| 42 | 499 | 20 | 1.12 | 1.70 |
| 43 | 488 | 21 | 1.14 | 1.62 |
| 44 | 619 | 14 | 0.94 | 2.52 |
| 45 | 602 | 11 | 0.89 | 3.00 |
| 46 | 619 | 10 | 0.87 | 1.64 |
| 47 | 620 | 12 | 0.84 | 1.47 |
| 48 | 518 | 18 | 1.04 | 2.43 |
| 50 | 580 | 18 | 0.95 | 2.63 |

TABLE 8-continued

| Mixture No. | $\lambda_{max}$ [nm] | LF (h) | $Q*\left[\dfrac{mJ}{dot}\right]$ | $m\left[\dfrac{1}{mJ}\right]$ |
|---|---|---|---|---|
| 52 | 597 | 15 | 0.92 | 2.43 |
| 53 | 561 | 26 | 0.90 | 2.53 |
| 54 | 535 | 20 | 0.87 | 2.55 |
| 55 | 519 | 18 | 0.81 | 2.48 |
| 56 | 566 | 15 | | |
| 57 | 547 | 16 | | |
| 58 | 507 | 14 | 1.07 | 1.61 |
| 59 | 459 | 12 | | |
| 60 | 564 | 6 | | |
| 61 | 588 | 20 | | |
| 62 | 618 | 32 | 0.96 | 2.53 |
| 63 | 625 | 15 | 0.95 | 2.28 |
| 64 | 622 | 14 | 1.00 | 2.21 |
| 65 | 518 | 18 | 1.04 | 2.43 |
| 66 | 621 | 18 | 0.92 | 2.56 |
| 69 | 593 | | 1.07 | 1.84 |
| 70 | 593 | | 0.96 | 2.56 |
| 71 | 580 | | 1.06 | 1.91 |
| 72 | 581 | | 0.93 | 2.88 |
| 73 | 580 | | 0.96 | 2.90 |
| 74 | 591 | | 0.95 | 2.79 |
| 75 | 593 | | 0.93 | 3.00 |
| 78 | 593 | | 1.21 | 1.67 |
| 79 | 477 | | 1.19 | 1.88 |
| 80 | 610 | | 1.18 | 1.59 |
| 81 | 506 | | 1.17 | 1.30 |
| 82 | 587 | | 1.15 | 1.63 |
| 83 | 587 | | 1.18 | 1.55 |
| 84 | 595 | | 1.24 | 1.36 |
| 85 | 535 | | 1.05 | 1.87 |
| 86 | 584 | | 1.10 | 1.77 |
| 87 | 581 | | 1.20 | 1.36 |
| 88 | 583 | | 1.24 | 1.42 |

After being used for printing, mixture Nos. 69 to 73, 75, 76, 78, 83 and 84 provide the image with attractive shades of gray and black with minimal color cast.

We claim:

1. A dye mixture consisting essentially of one or more azo dyes (F1) of the formula I

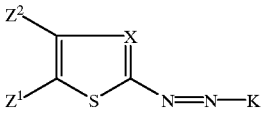

(I)

where

K is a radical of the formula

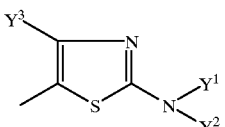

X is nitrogen or C—$Z^3$, $Z^1$ is nitro, cyano, $C_1$–$C_6$-alkanoyl, benzoyl, $C_1$–$C_8$-alkoxycarbonyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl or a radical of one of the following formulae (IIa)–(IIg):

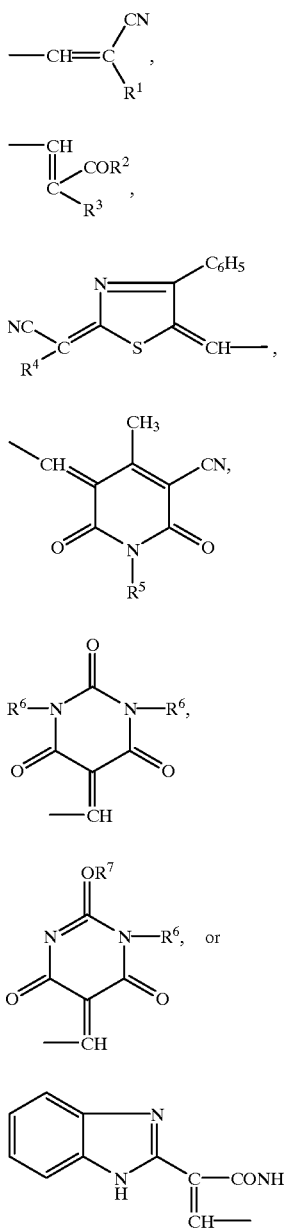

where $R^1$ is cyano, nitro, $C_1-C_6$-alkanoyl, unsubstituted or $C_1-C_4$-alkyl-, $C_1-C_4$-alkoxy-, halogen- or nitro-substituted benzoyl, $C_1-C_8$-alkylsulfonyl, unsubstituted or $C_1-C_4$-alkyl-, $C_1-C_4$-alkoxy-, halogen- or nitro-substituted phenylsulfonyl, $C_1-C_8$-alkoxycarbonyl, $C_3-C_4$-alkenyloxycarbonyl, phenoxycarbonyl, carbamoyl, mono- or di($C_1-C_4$-alkyl)carbamoyl, unsubstituted or $C_1-C_4$-alkyl-, $C_1-C_4$-alkoxy-, halogen- or nitro-substituted phenylcarbamoyl, unsubstituted or $C_1-C_4$-alkyl-, $C_1-C_4$-alkoxy-, halogen- or nitro-substituted phenyl, benzothiazol-2-yl, benzimidazol-2-yl, 5-phenyl-1,3,4-thiadiazol-2-yl or 2hydroxyquinoxalin-3-yl, $R^2$ is $C_1-C_6$-alkyl, $C_1-C_6$-alkoxy or $C_3-C_4$-alkenyloxy, $R^3$ is $C_1-C_8$-alkoxycarbonyl, $C_3-C_4$-alkenyloxycarbonyl, phenylcarbamoyl or benzimidazol-2-yl, $R^4$ is cyano, $C_1-C_8$-alkoxycarbonyl or $C_3-C_4$-alkenyloxycarbonyl, $R^5$ is hydrogen or $C_1-C_6$-alkyl, $R^6$ is hydrogen, $C_1-C_6$-alkyl or phenyl, and $R^7$ is $C_1-C_6$-alkyl;

$Z^2$ is hydrogen, $C_1-C_6$-alkyl, unsubstituted or $C_1-C_4$-alkyl-, $C_1-C_4$-alkoxy-, halogen- or nitro-substituted phenyl, cyano, halogen, unsubstituted or phenyl- or $C_1-C_4$-alkoxy-substituted $C_1-C_6$-alkoxy, unsubstituted or phenyl-substituted $C_1-C_8$-alkylthio, unsubstituted or $C_1-C_4$-alkyl-, $C_1-C_4$-alkoxy-, halogen- or nitro-substituted phenylthio, $C_1-C_8$-alkylsulfonyl, unsubstituted or $C_1-C_4$-alkyl-, $C_1-C_4$-alkoxy-, halogen- or nitro-substituted phenylsulfonyl or $C_1-C_8$-alkoxycarbonyl, $Z^3$ is $C_1-C_8$-alkoxycarbonyl, cyano, nitro or hydrogen, $Y^1$ and $Y^2$ are independently of each other unsubstituted $C_1-C_{10}$-alkyl which may be interrupted by 1 to 4 oxygen atoms in ether function, $C_1-C_{10}$-alkyl which may be interrupted by 1 to 4 oxygen atoms in ether function and which is substituted by cyano, hydroxyl, halogen, $C_1-C_4$-alkanoyloxy, $C_1-C_4$-alkoxycarbonyl, $C_1-C_4$-alkoxycarbonyloxy, wherein the alkyl chain of the last three radicals may be interrupted by 1 oxygen atom in ether function, $C_5-C_7$-cycloalkyl, $C_3-C_4$-alkenyl, unsubstituted phenyl, phenyl which is substituted by $C_1-C_4$-alkyl-, $C_1-C_4$-alkoxy-, halogen or nitro, or $Y^1$ and $Y^2$ together with nitrogen atom joining them together are a 5- or 6-membered saturated heterocyclic radical with or without further hetero atoms, or else $Y^1$ is hydrogen, $Y^3$ is $C_1-C_{10}$-alkyl, $C_5-C_7$-cycloalkyl or unsubstituted or $C_1-C_4$-alkyl-, $C_1-C_4$-alkoxy-, halogen- or nitro-substituted phenyl, one or more dyes (F2) which have their respective absorption maximum at a wavelength of from 410 to 530 nm, the Full Width Half Maximum (FWHM) value of the absorption maximum of each of the dyes F2 being at least 2000 cm$^{-1}$, wherein the dyes F2 are selected from the group consisting of dyes (A)–(D) as follows:

(A) azo dyes of the formula III

where K' is a radical of the formula

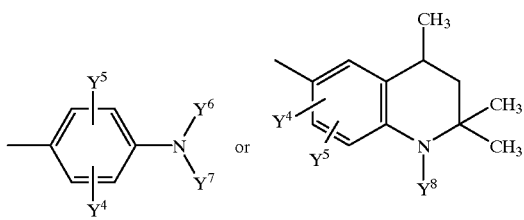

where $Y^4$ is hydrogen, $C_1-C_{10}$-alkyl with or without interruption by from 1 to 4 oxygen atoms in ether function, hydroxyl, $C_1-C_6$-alkoxy, $C_1-C_4$-alkylsulfonylamino, mono- or di($C_1-C_8$-alkyl)aminosulfonylamino or the radical —NHCOY$^9$ or —NHCO$_2$Y$^9$, where Y$^9$ is phenyl, benzyl, tolyl or $C_1$–$C_{10}$-alkyl with or without interruption by from 1 to 4 oxygen atoms in ether function, $Y^5$ is hydrogen, $C_1$–$C_6$-alkyl or $C_1$–$C_6$-alkoxy, $Y^6$ and $Y^7$, a) when X of formula I is C—$Z^3$, are independently of each other hydrogen, unsubstituted $C_1$–$C_{10}$-alkyl which may be interrupted by 1 to 4 oxygen atoms in ether function, $C_1$–$C_{10}$-alkyl which may be interrupted by 1 to 4 oxygen atoms in ether function and which is substituted by cyano, hydroxyl, halogen, $C_1$–$C_4$-alkanoyloxy, $C_1$–$C_4$-alkoxycarbonyl, $C_1$–$C_4$-alkoxycarbonyloxy, wherein the alkyl chain of the last three radicals may be interrupted by 1 oxygen atom in ether function, $C_5$–$C_7$-cycloalkyl, $C_3$–$C_4$-alkenyl, unsubstituted phenyl, phenyl which is substituted by $C_1$–$C_4$-alkyl-, $C_1$–$C_4$-alkoxy, halogen or nitro, or $Y^6$ and $Y^7$ together with the nitrogen atom joining them together are a 5- or 6-membered saturated heterocyclic radical with or without further hetero atoms, or b) when X of formula I is nitrogen, are each $C_1$–$C_{10}$-alkyl which is unsubstituted or substituted by phenyl and may be interrupted by 1 oxygen atom in ether function, with the proviso that $Y^6$ and $Y^7$ are different in case b), and $Y^8$ is hydrogen or $Y^1$, D is a radical of the formula

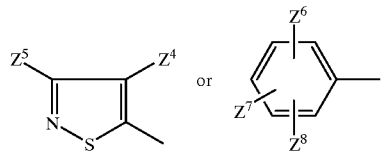

where $Z^4$ is hydrogen, cyano, $C_1$–$C_8$-alkoxycarbonyl, $C_1$–$C_6$-alkanoyl, thiocyanato, halogen or nitro, $Z^5$ is cyano, unsubstituted or phenyl-substituted $C_1$–$C_6$-alkyl, unsubstituted or phelnyl-substituted $C_1$–$C_{10}$-alkoxy, unsubstituted or phenyl-substituted $C_1$–$C_{10}$-alkylthio, unsubstituted or $C_1$–$C_4$-alkyl-, $C_1$–$C_4$-alkoxy, halogen-, or nitro-substituted phenyl, thienyl, $C_1$–$C_4$-alkylthienyl, pyridyl or $C_1$–$C_4$-alkylpyridyl, or $Z^4$ and $Z^5$ together are the radical of a fused-on benzene ring, $Z^6$, $Z^7$ and $Z^8$ are each independently of the other hydrogen, $C_1$–$C_6$-alkyl, $C_1$–$C_6$-alkoxy, halogen, nitro, cyano, unsubstituted or phenoxy-substituted $C_1$–$C_8$-alkoxycarbonyl, $C_1$–$C_8$-alkylsulfonyl or unsubstituted or $C_1$–$C_4$-alkyl-, $C_1$–$C_4$-alkoxy-, halogen- or nitro-substituted phenylsulfonyl, or $Z^3$ and $Z^4$ are together a radical of the formula CO—NW—CO, where W is $C_1$–$C_{10}$-alkyl with or without interruption by 1 or 2 oxygen atoms in ether function and with or without hydroxyl substitution, (B) disazo dyes of the formula IV

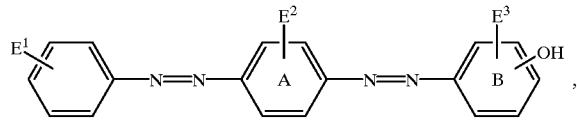

where $E^1$ is hydrogen, $C_1$–$C_6$-alkyl or nitro, $E^2$ is hydrogen, $C_1$–$C_6$-alkyl or $C_1$–$C_6$-alkoxy, $E^3$ is hydrogen or $C_1$–$C_6$-alkyl and the rings A and B may each be benzofused, (C) methine dyes of the formulae V to VII

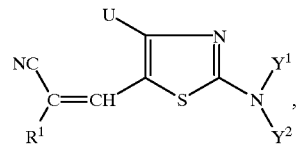

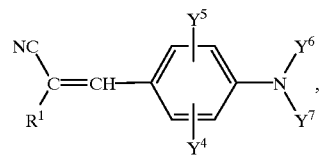

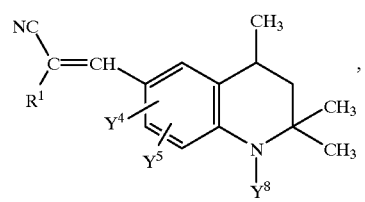

where

U is hydrogen, halogen, $C_1$–$C_8$-alkyl, unsubstituted or $C_1$–$C_4$-alkyl-, $C_1$–$C_4$-alkoxy-, halogen- or nitro-substituted phenyl, unsubstituted or $C_1$–$C_4$-alkyl-, $C_1$–$C_4$-alkoxy-, halogen- or nitro-substituted benzyl, $C_5$–$C_7$-Cycloalkyl, thienyl, hydroxyl or mono($C_1$–$C_8$-alkyl)amino, and $R^1$, $Y^1$, $Y^2$, $Y^4$, $Y^5$, $Y^6$, $Y^7$ and $Y^8$ are each as defined above, and (D) anthraquinone dyes of the formula XI

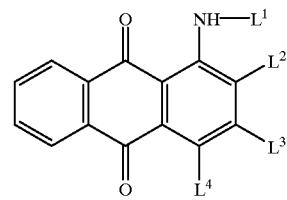

where $L^1$ is hydrogen, $C_1$–$C_{10}$-alkyl or unsubstituted or $C_1$–$C_4$-alkyl-, $C_1$–$C_4$-alkoxy-, halogen- or nitro-substituted phenyl, L² and L³ are independently of each other hydrogen, unsubstituted or phenyl- or C₁–C₄-alkylphenyl-substituted C₁–C₁₀-alkoxy, substituted or phenyl-substituted C₁–C₁₀-alkylthio, halogen, hydroxyphenyl, C₁–C₄-alkoxyphenyl or a radical of the formula

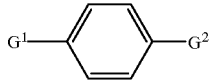

where G¹ is oxygen or sulfur and G² is hydrogen or mono(C₁–C₈-alkyl)sulfamoyl whose alkyl chain may be interrupted by 1 or 2 oxygen atoms in ether function, and L⁴ is amino, hydroxyl or unsubstituted or phenyl-substituted C₁–C₁₀-alkylthio.

2. The dye mixtures as claimed in claim 1, comprising one or more azo dyes F1 of the formula I where Z¹ is cyano, C₁–C₄-alkanoyl or a radical of the formula —CH=C(CN)₂ or —CH=C(CN)COOQ, where Q is C₁–C₈-alkyl, and Z² is C₁–C₄-alkyl, halogen or C₁–C₄-alkoxy.

3. The dye mixture as claimed in claim 1, comprising one or more azo dyes F1 of the formula I where K is a radical of the formula

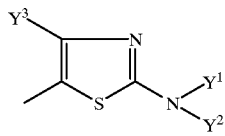

where

Y¹ and Y² are independently of each other C₁–C₁₀-alkyl with or without interruption by 1 or 2 oxygen atoms in ether function or unsubstituted or substituted phenyl, or else Y¹ is hydrogen, and Y³ is C₁–C₆-alkyl, C₅–C₇-cycloalkyl or phenyl.

4. The dye mixtures as claimed in claim 1, comprising one or more azo dyes F1 of the formula I where X is nitrogen or the radical C—CN.

5. The dye mixtures as claimed in claim 1, comprising one or more dyes F2.

6. The dye mixtures as claimed in claim 1, comprising from 30 to 70% by weight of one or more dyes F1 and from 30 to 70% by weight of one or more dyes F2, based on the weight of the dye mixtures.

7. A process comprising transferring dyes from a support to a plastic-coated paper by diffusion or sublimation with the aid of an energy source, wherein said support comprises a dye mixture as claimed in claim 1.

8. A process for dyeing or printing synthetic materials, which comprises treating the synthetic materials with a dye mixture as claimed in claim 1.

9. A dye mixture consisting essentially of one or more azo dyes (F1) of the formula I

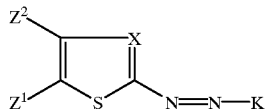

(I)

where

K is a radical of the formula

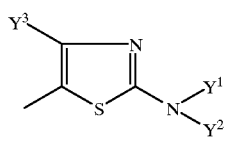

X is nitrogen or C—Z³,

Z¹ is nitro, cyano, C₁–C₆-alkanoyl, benzoyl, C₁–C₈-alkylsulfonyl, unsubstituted or C₁–C₄-alkyl-, C₁–C₄-alkoxy-, halogen- or nitro-substituted phenylsulfonyl or a radical of one of the following formulae (IIa)–(IIg):

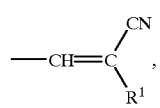

(IIa)

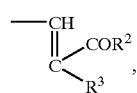

(IIb)

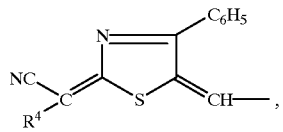

(IIc)

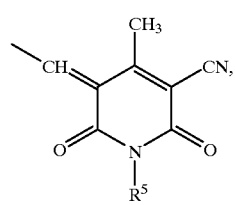

(IId)

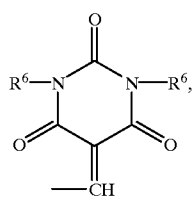

(IIe)

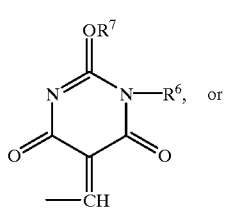

(IIf)

-continued

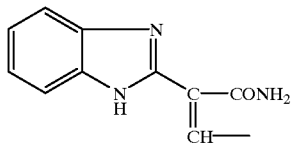

(IIg)

where $R^1$ is cyano, nitro, $C_1$–$C_6$-alkanoyl, unsubstituted or $C_1$–$C_4$-alkyl-, $C_1$–$C_4$-alkoxy-, halogen- or nitro-substituted benzoyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl, $C_1$–$C_8$-alkoxycarbonyl, $C_3$–$C_4$-alkenyloxycarbonyl, phenoxycarbonyl, carbamoyl, mono- or di($C_1$–$C_4$-alkyl)carbamoyl, unsubstituted or $C_1$–$C_4$-alkyl-, $C_1$–$C_4$-alkoxy-, halogen- or nitro-substituted phenylcarbamoyl, unsubstituted or $C_1$–$C_4$-alkyl-, $C_1$–$C_4$-alkoxy-, halogen- or nitro-substituted phenyl, benzothiazol-2-yl, benzimidazol-2-yl, 5-phenyl-1,3,4-thiadiazol-2-yl or 2-hydroxyquinoxalin-3-yl, $R^2$ is $C_1$–$C_6$-alkyl, $C_1$–$C_6$-alkoxy or $C_3$–$C_4$-alkenyloxy, $R^3$ is $C_1$–$C_8$-alkoxycarbonyl, $C_3$–$C_4$-alkenyloxycarbonyl, phenylcarbamoyl or benzimidazol-2-yl, $R^4$ is cyano, $C_1$–$C_8$-alkoxycarbonyl or $C_3$–$C_4$-alkenyloxycarbonyl, $R^5$ is hydrogen or $C_1$–$C_6$-alkyl, $R^6$ is hydrogen, $C_1$–$C_6$-alkyl or phenyl, and $R^7$ is $C_1$–$C_6$-alkyl;

$Z^2$ is hydrogen, $C_1$–$C_6$-alkyl, unsubstituted or $C_1$–$C_4$-alkyl-, $C_1$–$C_4$-alkoxy-, halogen- or nitro-substituted phenyl, cyano, halogen, unsubstituted or phenyl- or $C_1$–$C_4$-alkoxy-substituted $C_1$–$C_6$-alkoxy, unsubstituted or phenyl-substituted $C_1$–$C_8$-alkylthio, unsubstituted or $C_1$–$C_4$-alkyl-, $C_1$–$C_4$-alkoxy-, halogen- or nitro-substituted phenylthio, $C_1$–$C_8$-alkylsulfonyl, unsubstituted or $C_1$–$C_4$-alkyl-, $C_1$–$C_4$-alkoxy-, halogen- or nitro-substituted phenylsulfonyl or $C_1$–$C_8$-alkoxycarbonyl, $Z^3$ is $C_1$–$C_8$-alkoxycarbonyl, cyano, nitro or hydrogen, $Y^1$ and $Y^2$ are independently of each other unsubstituted $C_1$–$C_{10}$-alkyl which may be interrupted by 1 to 4 oxygen atoms in ether function, $C_1$–$C_{10}$-alkyl which may be interrupted by 1 to 4 oxygen atoms in ether function and which is substituted by cyano, hydroxyl, halogen, $C_1$–$C_4$-alkanoyloxy, $C_1$–$C_4$-alkoxycarbonyl, $C_1$–$C_4$-alkoxycarbonyloxy, wherein the alkyl chain of the last three radicals may be interrupted by 1 oxygen atom in ether function, $C_5$–$C_7$-cycloalkyl, $C_3$–$C_4$-alkenyl, unsubstituted phenyl, phenyl which is substituted by $C_1$–$C_4$-alkyl-, $C_1$–$C_4$-alkoxy-, halogen or nitro, or $Y^1$ and $Y^2$ together with nitrogen atom joining them together are a 5- or 6-membered saturated heterocyclic radical with or without further hetero atoms, or else $Y^1$ is hydrogen, $Y^3$ is $C_1$–$C_{10}$-alkyl, $C_5$–$C_7$-cycloalkyl or unsubstituted or $C_1$–$C_4$-alkyl-, $C_1$–$C_4$-alkoxy-, halogen- or nitro-substituted phenyl, one or more dyes (F2) which have their respective absorption maximum at a wavelength of from 410 to 530 nm, the Full Width Half Maximum (FWHM) value of the absorption maximum of each of the dyes F2 being at least 2000 cm$^{-1}$, wherein the dyes F2 are selected from the group consisting of dyes (B)–(D) as follows:

(B) disazo dyes of the formula IV

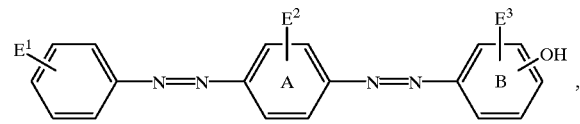

(IV)

where $E^1$ is hydrogen, $C_1$–$C_6$-alkyl or nitro, $E^2$ is hydrogen, $C_1$–$C_6$-alkyl or $C_1$–$C_6$-alkoxy, $E^3$ is hydrogen or $C_1$–$C_6$-alkyl and the rings A and B may each be benzofused, (C) methine dyes of the formulae V to VII

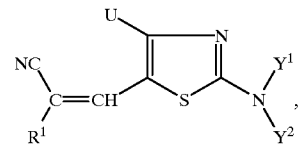

(V)

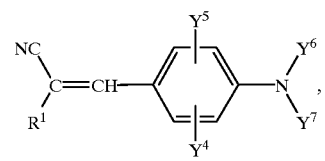

(VI)

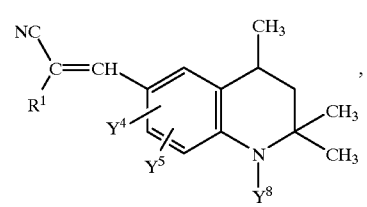

(VII)

where

U is hydrogen, halogen, $C_1$–$C_8$-alkyl, unsubstituted or $C_1$–$C_4$-alkyl-, $C_1$–$C_4$-alkoxy-, halogen- or nitro-substituted phenyl, unsubstituted or $C_1$–$C_4$-alkyl-, $C_1$–$C_4$-alkoxy-, halogen- or nitro-substituted benzyl, $C_5$–$C_7$-cycloalkyl, thienyl, hydroxyl or mono($C_1$–$C_8$-alkyl)amino, and $R^1$, $Y^1$, and $Y^2$, are each as defined above, $Y^4$ is hydrogen, $C_1$–$C_{10}$-alkyl with or without interruption by from 1 to 4 oxygen atoms in ether function, hydroxyl, $C_1$–$C_6$-alkoxy, $C_1$–$C_4$-alkylsulfonylamino, mono- or di($C_1$–$C_8$-alkyl)aminosulfonylamino or the radical —NHCOY$^9$ or —NHCO$_2$Y$^9$, where $Y^9$ is phenyl, benzyl, tolyl or $C_1$–$C_{10}$-alkyl with or without interruption by from 1 to 4 oxygen atoms in ether function, $Y^5$ is hydrogen, $C_1$–$C_6$-alkyl or $C_1$–$C_6$-alkoxy, $Y^6$ and $Y^7$, a) when X of formula I is C—$Z^3$, are independently of each other hydrogen, unsubstituted $C_1$–$C_{10}$-alkyl which may be interrupted by 1 to 4 oxygen atoms in ether function, $C_1$–$C_{10}$-alkyl which may be interrupted by 1 to 4 oxygen atoms in ether function and which is substituted by cyano, hydroxyl, halogen, $C_1$–$C_4$-alkanoyloxy, $C_1$–$C_4$-alkoxycarbonyl, $C_1$–$C_4$-alkoxycarbonyloxy, wherein the alkyl chain of the last three radicals may be interrupted by 1 oxygen atom in ether function, $C_5$–$C_7$-cycloalkyl, $C_3$–$C_4$-alkenyl, unsubstituted phenyl, phenyl which is substituted by $C_1$–$C_4$-alkyl-, $C_1$–$C_4$-alkoxy, halogen or nitro, or $Y^6$ and $Y^7$ together with the nitrogen atom joining them together are a 5- or 6-membered saturated heterocyclic radical with or without further hetero atoms, or b) when X of formula I is nitrogen, are each $C_1$–$C_{10}$-alkyl which is unsubstituted or substituted by phenyl and may be interrupted by 1 oxygen atom in ether function, with the proviso that $Y^6$ and $Y^7$ are different in case b), and $Y^8$ is hydrogen or $Y^1$, and (D) anthraquinone dyes of the formula XI

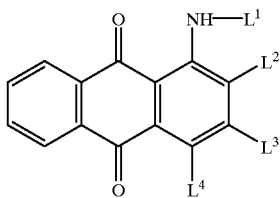

(XI)

where $L^1$ is hydrogen, $C_1$–$C_{10}$-alkyl or unsubstituted or $C_1$–$C_4$-alkyl-, $C_1$–$C_4$-alkoxy-, halogen- or nitro-substituted phenyl, $L^2$ and $L^3$ are independently of each other hydrogen, unsubstituted or phenyl- or $C_1$–$C_4$-alkylphenyl-substituted $C_1$–$C_{10}$-alkoxy, substituted or phenyl-substituted $C_1$–$C_{10}$-alkylthio, halogen, hydroxyphenyl, $C_1$–$C_4$-alkoxyphenyl or a radical of the formula

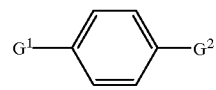

where $G^1$ is oxygen or sulfur and $G^2$ is hydrogen or mono($C_1$–$C_8$-alkyl)sulfamoyl whose alkyl chain may be interrupted by 1 or 2 oxygen atoms in ether function, and $L^4$ is amino, hydroxyl or unsubstituted or phenyl-substituted $C_1$–$C_{10}$-alkylthio.

* * * * *